United States Patent
Asai et al.

(10) Patent No.: US 7,616,554 B2
(45) Date of Patent: Nov. 10, 2009

(54) CONTROLLER AND TRANSMISSION AND RECEPTION METHOD FOR RADIO COMMUNICATIONS IN A TRANSCEIVER FOR RADIO COMMUNICATIONS

(75) Inventors: Takahiro Asai, Yokosuka (JP); Yasuhiro Oda, Yokohama (JP); Takatoshi Sugiyama, Yokohama (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 626 days.

(21) Appl. No.: 11/348,376

(22) Filed: Feb. 7, 2006

(65) Prior Publication Data

US 2006/0209746 A1    Sep. 21, 2006

(30) Foreign Application Priority Data

Feb. 9, 2005    (JP)    ............................. 2005-033337

(51) Int. Cl.
    *H04J 11/00*    (2006.01)
(52) U.S. Cl. ....................................... 370/203; 370/329
(58) Field of Classification Search ................. 370/241, 370/252, 203, 208, 310, 328, 329, 330; 704/200, 704/201, 211, 216, 217; 708/100, 200, 420, 708/421, 422, 426
    See application file for complete search history.

(56) References Cited

U.S. PATENT DOCUMENTS

| | | | |
|---|---|---|---|
| 6,658,050 B1 * | 12/2003 | Ramesh et al. | 375/219 |
| 6,700,919 B1 * | 3/2004 | Papasakellariou | 375/130 |
| 7,346,116 B2 * | 3/2008 | Moher | 375/260 |
| 2004/0047324 A1 | 3/2004 | Diener | |
| 2005/0286465 A1 * | 12/2005 | Zhuang | 370/329 |
| 2007/0184783 A1 * | 8/2007 | Rosenfeld | 455/67.11 |

FOREIGN PATENT DOCUMENTS

| | | |
|---|---|---|
| JP | 2001-237846 | 8/2001 |
| JP | 2003-143106 | 5/2003 |
| JP | 2004-201338 | 7/2004 |
| WO | WO 98/14018 | 4/1998 |
| WO | WO 03/047290 A1 | 6/2003 |

OTHER PUBLICATIONS

Menguec Oner, et al., "Extracting the Channel Allocation Information in a Spectrum Pooling System Exploiting Cyclostationarity", Proc. of 15th IEEE International Symposium on Personal, Indoor and Mobile Radio Communications, Sep. 2004, pp. 551-555.

Amod V. Dandawate, et al., "Statistical Tests for Presence of Cyclostationarity", IEEE Transactions on Signal Processing, vol. 42, No. 9, Sep. 1994, pp. 2355-2369.

(Continued)

*Primary Examiner*—Pankaj Kumar
*Assistant Examiner*—Obaidul Huq
(74) *Attorney, Agent, or Firm*—Oblon, Spivak, McClelland, Maier & Neustadt, L.L.P.

(57) ABSTRACT

A controller in a transceiver for radio communications in which the same frequency is shared between multiple communications systems is disclosed that includes: a cyclic autocorrelation value calculation part configured to calculate the cyclic autocorrelation value of a first one of the communications systems from a received signal; and a data transmission authorization part configured to determine whether to authorize data transmission in a second one of the communications systems based on the calculated cyclic autocorrelation value of the first one of the communications systems.

9 Claims, 16 Drawing Sheets

OTHER PUBLICATIONS

Menguec Oner, et al., "Air Interface Recognition for a Software Radio System Exploiting Cyclostationarity", Proc. of 15th IEEE International Symposium on Personal, Indoor and Mobile Radio Communications, vol. 3, Sep. 2004, pp. 1947-1951.

Mengueç Oener, et al., "Cyclostationarity-Based Methods for the Extraction of the Channel Allocation Information in a Spectrum Pooling System", Radio and Wireless Conference, 2004 IEEE, XP-010764606, Sep. 19, 2004, pp. 279-282.

* cited by examiner

CONTROLLER AND TRANSMISSION AND RECEPTION METHOD FOR RADIO COMMUNICATIONS IN A TRANSCEIVER FOR RADIO COMMUNICATIONS

BACKGROUND OF THE INVENTION

1. Field of the Invention

The present invention generally relates to controllers and transmission and reception methods for radio communications in transceivers for radio communications, and more particularly to a controller and a transmission and reception method for radio communications in a transceiver for radio communications that performs communications without a non-priority system (a communications system using a frequency non-preferentially) affecting a priority system (a communications system using the frequency preferentially) in a frequency coexistence environment where multiple communications systems share the same frequency band.

2. Description of the Related Art

In radio communications, each radio communications system is assigned its dedicated frequency band in order to avoid mutual interference. For example, PDC, GSM, IMT-2000, PHS, and the wireless LAN in mobile communications use respective different frequency bands, and analog television and ground-wave digital television in broadcasting also use different frequency bands. However, in order to make effective use of limited frequencies in radio communications, it has been studied to use the same frequency band in multiple communication systems. For example, Oner, M. and F. Jondral; "Extracting the Channel Allocation Information in a Spectrum Pooling System Exploiting Cyclostationarity, "Proc. of $15^{th}$ IEEE International Symposium on Personal, Indoor and Mobile Radio Communications, September 2004 (Reference 1) discloses a method that classifies multiple communications systems sharing the same frequency band into priority systems and non-priority systems and prevents the non-priority systems from performing communications when the priority systems are performing or start communications, thereby achieving frequency coexistence without affecting the priority systems. Further, the above document discloses a method of identifying a priority system signal necessary for the frequency coexistence. In the above document, the frequency sharing between GSM and the wireless LAN is studied in particular. That is, a study is made of identifying GSM using signal cyclostationarity in the case of sharing the same frequency band between GSM and the wireless LAN with GSM being a priority system and the wireless LAN being a non-priority system. Specifically, a cyclic autocorrelation function is calculated using a received signal, and using the calculation result, the technique of hypothesis testing disclosed in Dandawate, A. V. and G. B. Giannakis; "Statistical tests for presence of Cyclostationarity," IEEE Trans. on Signal Processing, vol. 42, no. 9, pp. 2355-2362, September 1994 (Reference 2) is applied. As a result of the application, it is determined whether the signal of the priority GSM system exists in the received signal.

Such techniques of removing an interference signal or increasing signal reception accuracy using a cyclic autocorrelation function are also disclosed in, for example, Japanese Laid-Open Patent Application Nos. 2004-201338 (Reference 3) and 2003-143106 (Reference 4).

Further, Japanese Laid-Open Patent Application No. 2001-237846 (Reference 5) discloses a method of sharing the same frequency band between a wireless LAN system and a radar. FIG. 1 is a block diagram showing a receiver according to this method. The receiver includes a bandpass filter (BPF) 1, a low-noise amplifier 2, a frequency converter 3, a radar detector circuit 4, an automatic gain controller (AGC) 5, a local frequency generator 6, a reception level detector circuit 7, and an antenna 8. This method employs the radar detector circuit 4 to detect a radar wave. When the wireless LAN system recognizes transmission of a radar wave, communications are stopped in the wireless LAN system. This stoppage of communications in the wireless LAN system enables frequency sharing between the wireless LAN system and the radar without causing a problem for the business operation using the radar. According to this document, the radar detector circuit 4 detects a radar wave by a method of measuring the reception level and a method of measuring the continuation period of the reception level, focusing on a pulse-like radar shape.

In the wireless LAN system typified by the IEEE 802.11 standard, etc., an access control protocol called CSMA/CA (Carrier Sense Multiple Access with Collision Avoidance) is employed. According to this CSMA/CA protocol, it is determined whether to transmit data by measuring a signal reception level before transmitting the data. For example, under the IEEE 802.11a standard, if the reception level (carrier sense level) is −62 dBm or below, it is determined that there is no nearby terminal performing communications, so that data may be transmitted. If the carrier sense level is set to an extremely low value, the carrier sensing area expands, so that a response is made sensitively to even a weak signal from a remote place. This decreases the opportunity to transmit a signal, thus reducing signal transmission efficiency. On the other hand, if the carrier sense level is set to a high value, a signal is transmitted even if the level of a signal causing interference is high. Accordingly, a signal reception error occurs frequently because of significant effects of interference. Therefore, in order to cause CSMA to work normally, the carrier sense level is set to a suitable value. For instance, the IEEE 802.11a standard sets the carrier sense level to a value of −62 dBm.

FIG. 2 is a concept diagram of the case where this CSMA/CA method is employed as the access method of a non-priority system in a frequency sharing environment where priority and non-priority systems coexist. In FIG. 2, communication areas 201 of the priority systems and communication areas 203 of the non-priority systems are graphically represented. As described above, in the non-priority system using CSMA/CA, it is determined that signal transmission is performable if the signal reception level is at or below a carrier sense level. Accordingly, there is a region 205 where the areas in which communications are actually performable overlap each other. Further, in the case of applying the conventional CSMA/CA method to the non-priority systems, there is a region 207 where the range in which communications are performable in the priority system and the range in which communications are performable in the non-priority system overlap each other. Therefore, communications in the priority system are subjected to interference and hindered in the overlapping region 207. By lowering the carrier sense level, it is possible to reduce the effect of the non-priority system on the priority system. FIG. 3 is a concept diagram of the case where the carrier sense level is set to a low value. In this case, unlike in the case of FIG. 2, the area in which communications are performable in the priority system and the area in which communications are performable in the non-priority system do not overlap each other as indicated by reference numeral 211. Accordingly, it is possible to reduce the effect of the non-priority system on the priority system. However, as indicated by reference numeral 209, the overlapping region between the non-priority systems also disappears. This decreases transmission opportunities in the communications between the non-priority systems, thus reducing transmission efficiency.

Thus, in the case of performing frequency sharing between multiple communications systems using a method by which a non-priority system performs communications conducting carrier sensing according to the conventional CSMA method, setting a high carrier sense level causes a problem in that the non-priority system interferes with the priority system. On the other hand, setting a low carrier sense level in order to reduce interference causes a problem in that transmission opportunities in the communications between non-priority systems decrease so as to reduce transmission efficiency. These problems result from the fact that the received signal intensity of the priority system alone cannot be determined by merely measuring the reception level of a received signal that is a combination of the signals of the priority system and the non-priority system. The method of Reference 1 merely shows starting and stopping communications using the result of signal identification using signal cyclostationarity without any specific procedure. Further, Reference 1 fails to mention a method of achieving reduction in the non-priority system's interference with a priority system without causing reduction in transmission efficiency in the communications between non-priority systems. Furthermore, the method of Reference 5 is limited to frequency sharing in which a radar is a priority system. Accordingly, this method has the disadvantage of not being applicable to the case where a method other than a radar is a priority system.

SUMMARY OF THE INVENTION

Accordingly, it is a general object of the present invention to provide a controller and a transmission and reception method for radio communications in a transceiver for radio communications in which the above-described disadvantages are eliminated.

A more specific object of the present invention is to provide a controller and a transmission and reception method for radio communications in a transceiver for radio communications which controller and method prevent reduction in the efficiency of the communications between non-priority systems.

The above objects of the present invention are achieved by a controller in a transceiver for radio communications in which a same frequency is shared between a plurality of communications systems, including: a cyclic autocorrelation value calculation part configured to calculate a cyclic autocorrelation value of a first one of the communications systems from a received signal; and a data transmission authorization part configured to determine whether to authorize data transmission in a second one of the communications systems based on the calculated cyclic autocorrelation value of the first one of the communications systems.

The above objects of the present invention are also achieved by a radio communications transmission and reception method in a transceiver for radio communications in which a same frequency is shared between a plurality of communications systems, the radio communications transmission and reception method including the steps of: (a) calculating a cyclic autocorrelation value of a first one of the communications systems from a received signal; (b) determining whether to authorize data transmission in a second one of the communications systems based on the calculated cyclic autocorrelation value of the first one of the communications systems; and (c) performing the data transmission based on a determination in said step (b) that the data transmission should be authorized.

According to the above-described controller and method, the data transmission of a non-priority system (second communications system) is not authorized if the signal of a priority system (first communications system) is contained in a received signal.

Thus, according to one embodiment of the present invention, in a frequency coexistence environment where multiple systems share the same frequency band, it is possible to reduce the effect of a non-priority system on a priority system without decreasing the efficiency of the communications between non-priority systems.

A controller and a radio communications transmission and reception method in a transceiver for radio communications according to one embodiment of the present invention are also applicable in the case where a non-priority system performs communications using carrier sensing of CSMA, etc., with the existing broadcasting such as ground-wave digital television or radio communications including mobile communications such as PDC, PHS, and W-CDMA being a priority system.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 4:
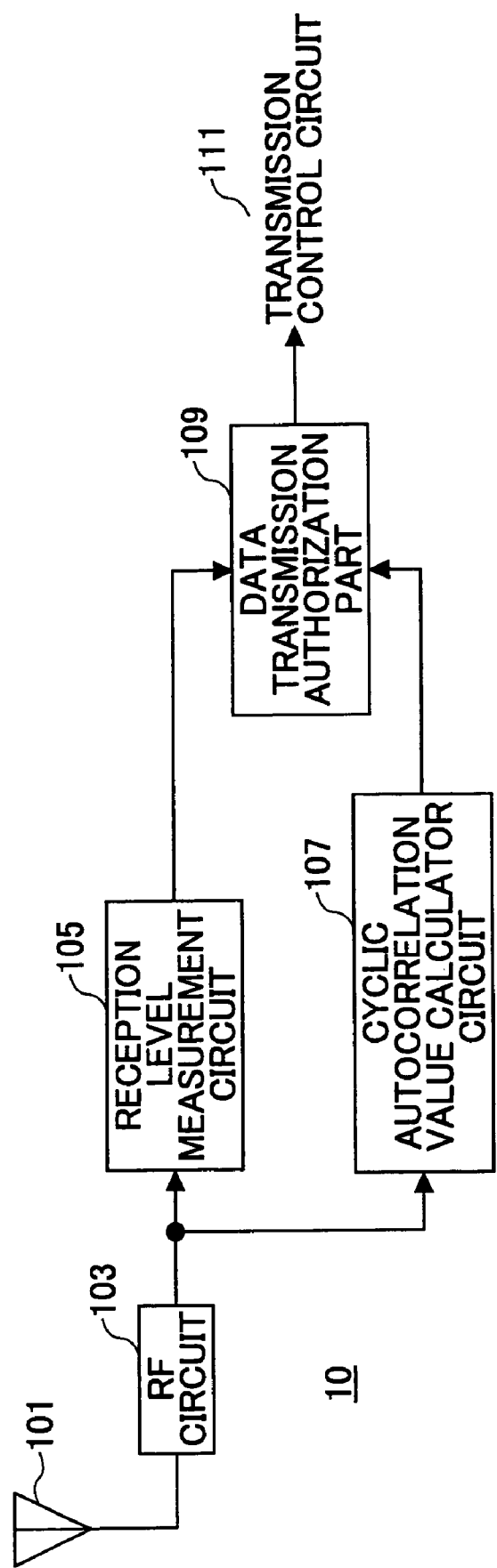
FIG. 4 is a block diagram showing a transceiver according to a first embodiment and a second embodiment of the present invention.

FIG. 4 is a block diagram showing a transceiver 10 of a non-priority system according to a first embodiment of the present invention. The non-priority system transceiver 10 includes an antenna 101, an RF circuit 103, a reception level measurement circuit 105, a cyclic autocorrelation value calculator circuit 107, and a data transmission authorization part 109. In the case of performing communications using carrier sensing according to CSMA, in the transceiver 10, a signal received through the antenna 101 is subjected to power amplification, band limiting, and down conversion through the RF circuit 103 so as to be converted into a baseband signal (not graphically illustrated).

The reception level measurement circuit 105 measures the level of the received signal from the baseband signal obtained as a result of the conversion. Further, the cyclic autocorrelation value calculator circuit 107 calculates a cyclic autocorrelation value using the baseband signal. Using both the measured level of the received signal and the calculated cyclic autocorrelation value, the data transmission authorization part 109 determines whether to authorize data transmission. A transmission control circuit 111 is notified of the result of the determination.

According to this embodiment, the reception level measurement circuit 105 measures the reception level of a received signal using a baseband signal into which the received signal is converted. Alternatively, the reception level may be measured in the RF circuit 103. In this case, the reception level value measured in the RF circuit 103 is fed to the reception level measurement circuit 105.

Figure 5:
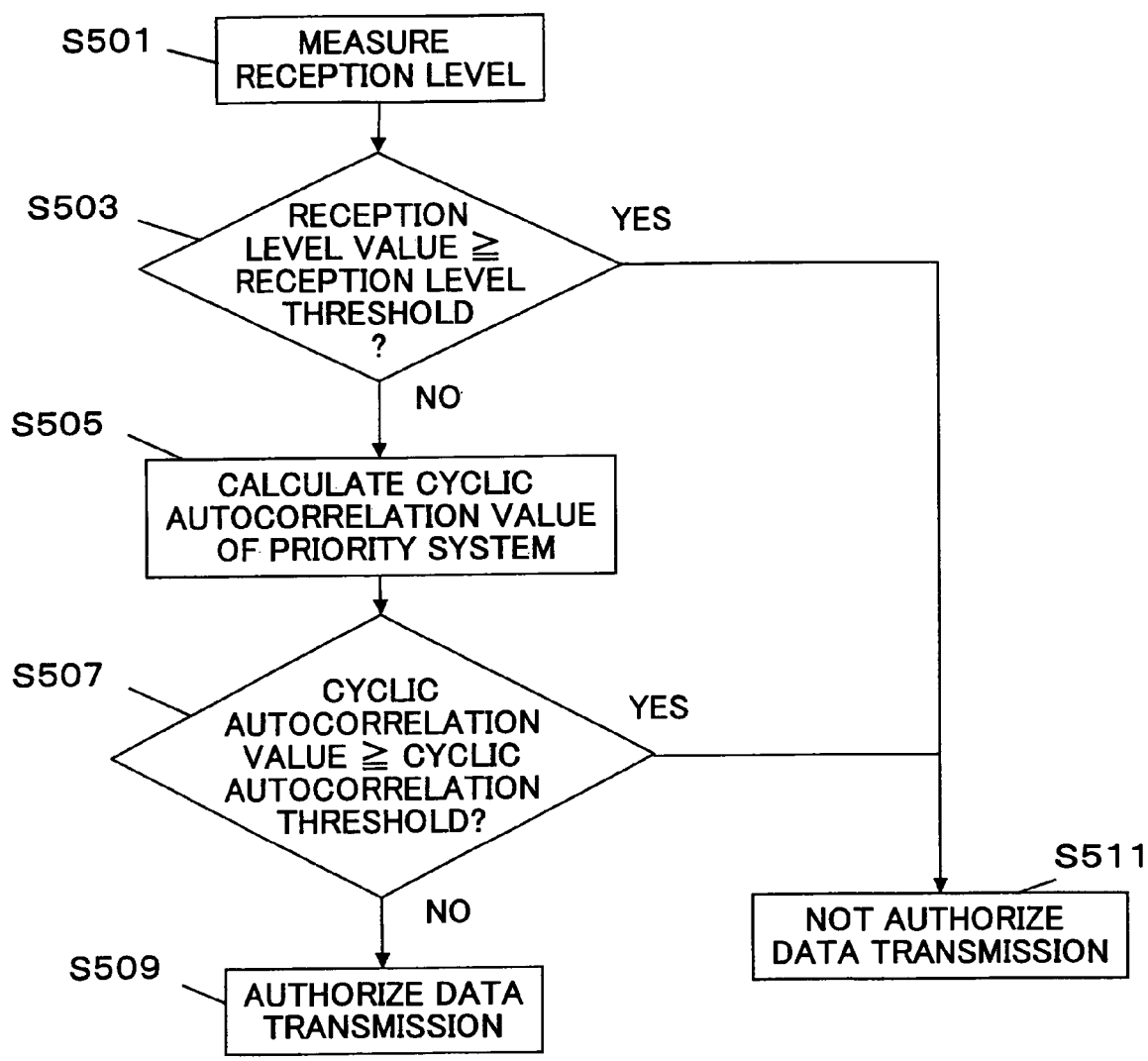
FIG. 5 is a flowchart showing a control procedure in the transceiver according to the first embodiment of the present invention.

FIG. 5 is a flowchart showing a control procedure in the transceiver 10. First, in step S501, the level of a received signal is measured, and in step S503, the measured reception level value of the received signal is compared with a preset reception level threshold. If the measured reception level value is greater than or equal to the reception level threshold (YES in step S503), in step S511, it is determined that data transmission should not be authorized. If the measured reception level value is less than the reception level threshold (NO in step S503), in step S505, the cyclic autocorrelation value of a priority system is calculated. In step S507, in order to estimate whether the priority system is included in the received signal, the cyclic autocorrelation value calculated using the received signal is compared with a preset cyclic autocorrelation threshold. As a result of the comparison, if the cyclic autocorrelation value is greater than or equal to the cyclic autocorrelation threshold (YES in step S507), it is determined that the priority system exists, and in step S511, data transmission is not authorized. If the cyclic autocorrelation value is less than the cyclic autocorrelation threshold (NO in step S507), it is determined that the priority system does not exist, and in step S509, data transmission is authorized.

Figure 1:
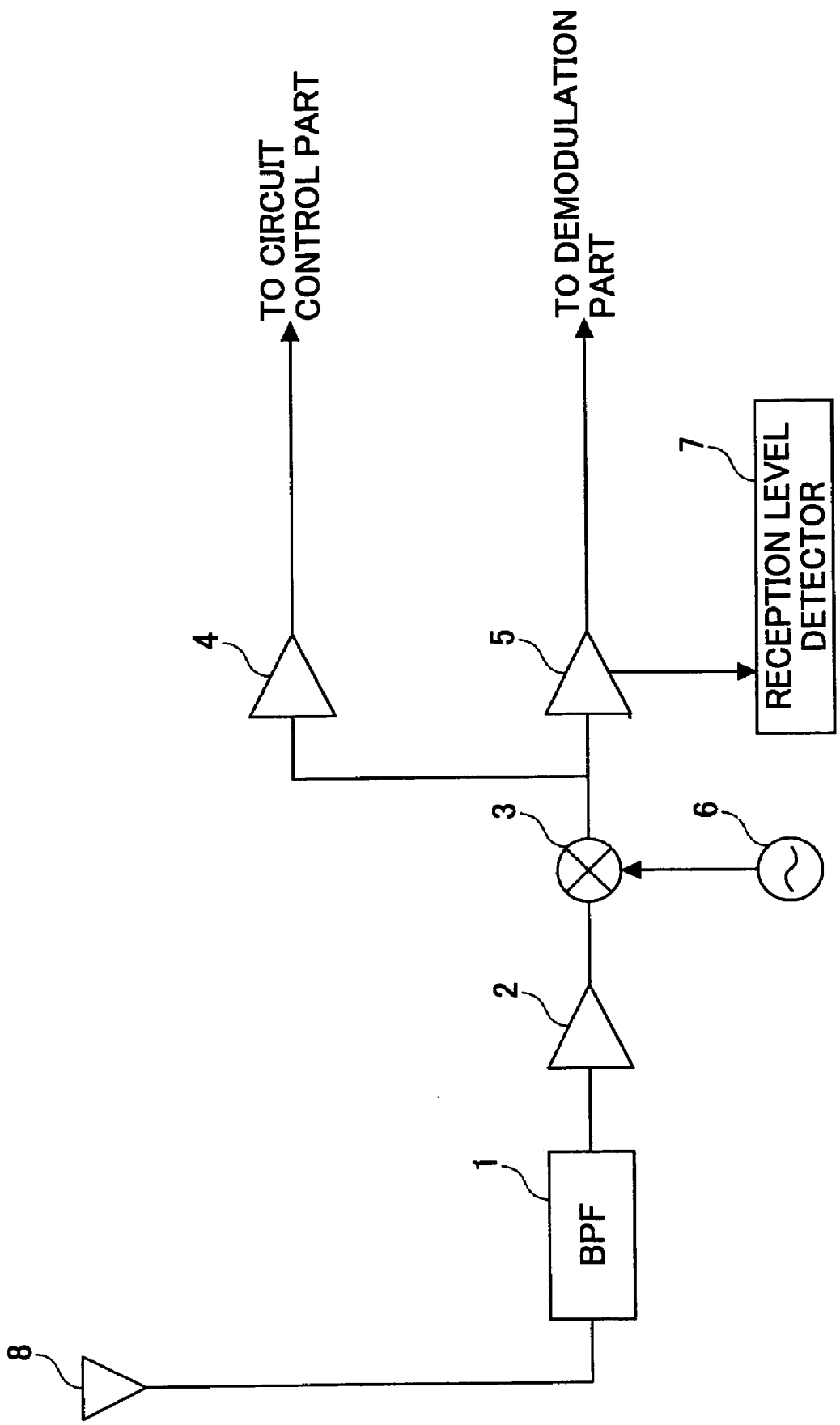
FIG. 1 is a block diagram showing a receiver according to a prior-art technology.
Figure 2:
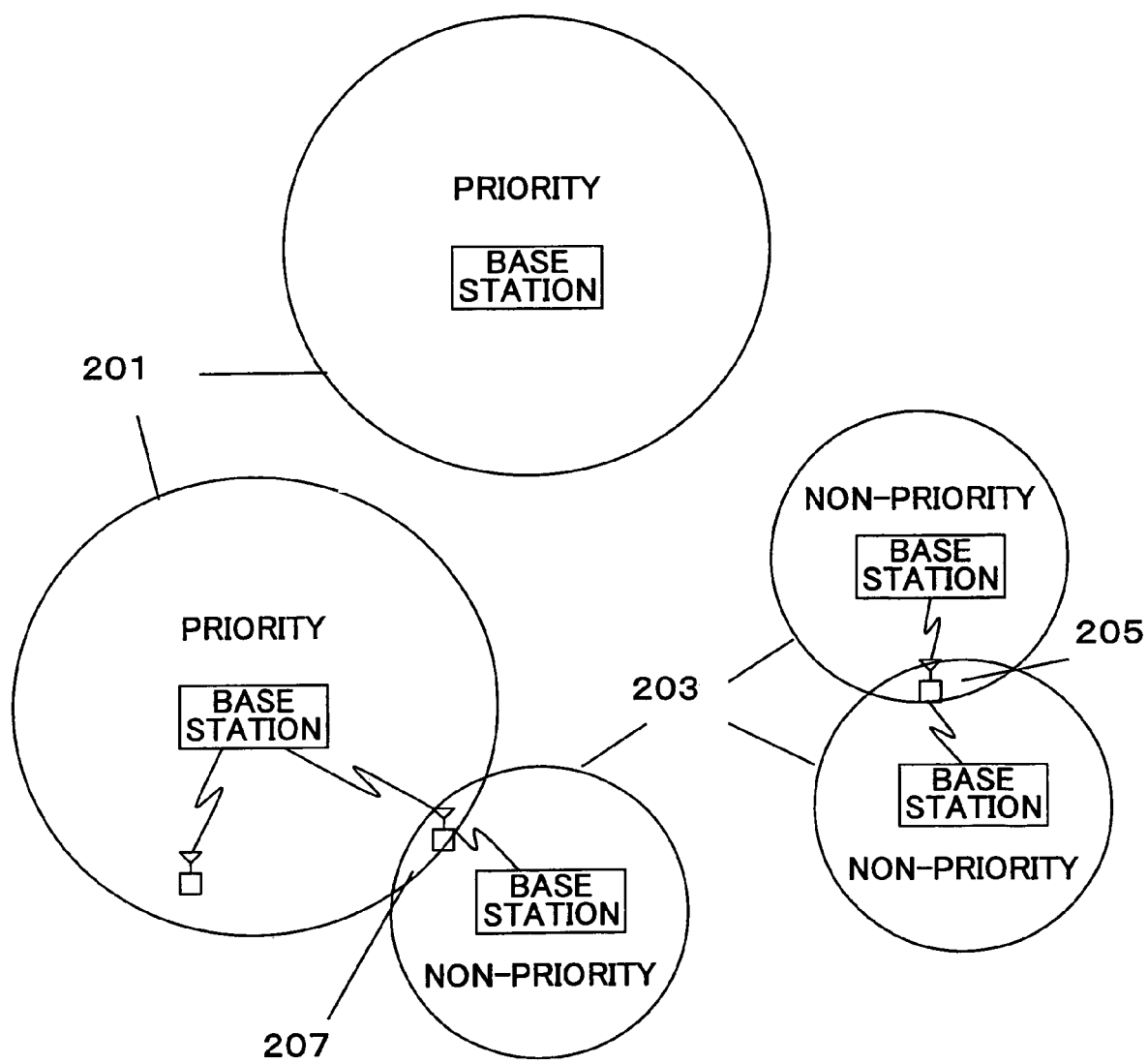
FIG. 2 is a concept diagram of frequency sharing using CSMA/CA.
Figure 3:
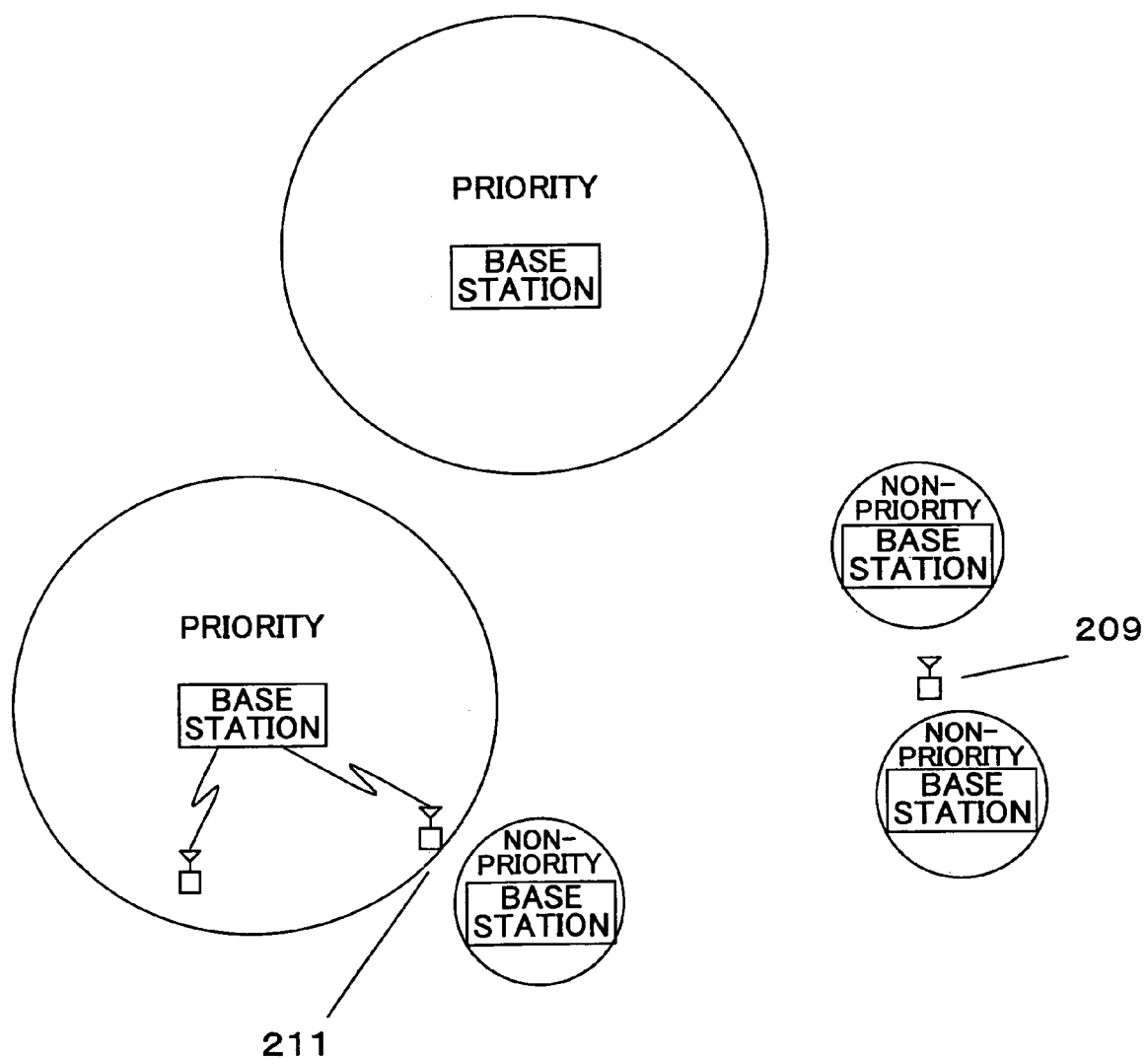
FIG. 3 is a concept diagram of frequency sharing in the case of setting a low carrier sense level in FIG. 2.
Figure 6:
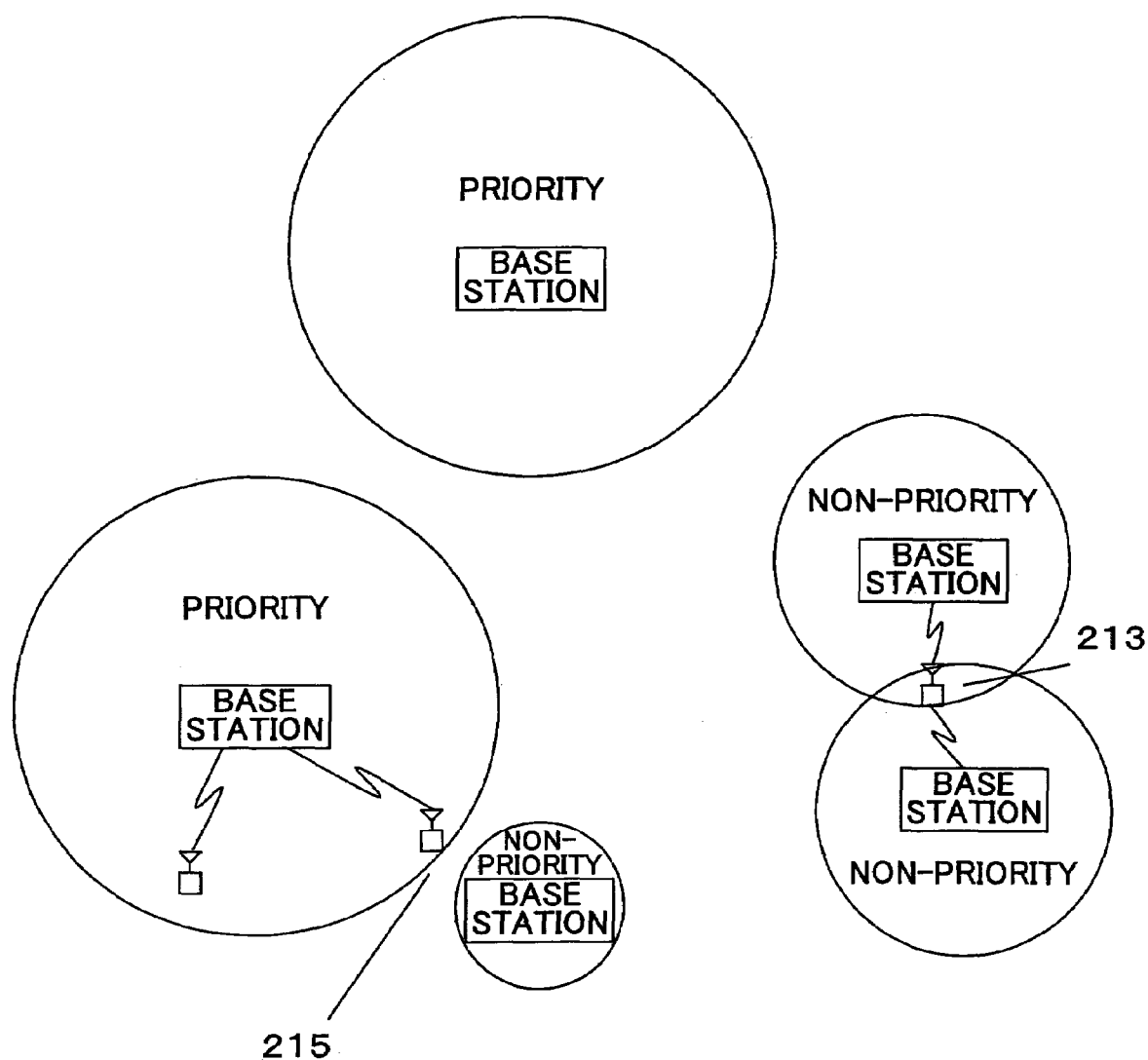
FIG. 6 is a concept diagram of frequency sharing in the case of application of the present invention according to the first embodiment of the present invention.

FIG. 6 is a concept diagram of frequency sharing in the case of employing this embodiment. If the reception level value of a received signal is less than the reception level threshold, and the cyclic autocorrelation value calculated using the received signal is less than the cyclic autocorrelation threshold, it is determined that no priority system exists in the vicinity. As a result, as in the case where only non-priority systems exist, it is determined, only by the reception level, whether to authorize data transmission. In consequence, as shown in FIG. 6, non-priority systems overlap each other in an area 213 as in the region 205 of FIG. 2. On the other hand, if the cyclic autocorrelation value calculated using the received signal is greater than or equal to the cyclic autocorrelation threshold, it is determined that a priority system exists, and data transmission is not authorized. As a result, it is possible to prevent the area of a non-priority system and the area of the priority system from overlapping each other as indicated by reference numeral 215 in FIG. 6. Thus, by employing this embodiment, it is possible to reduce the effect of a non-priority system on a priority system, and at the same time, it is possible to prevent reduction in transmission efficiency by allowing overlapping in the communications between non-priority systems.

The size of the overlapping region between non-priority systems may be determined by the preset reception level threshold. Further, the magnitude of the effect of a non-priority system on a priority system may be determined by the preset cyclic autocorrelation threshold.

Next, a detailed description is given below of the cyclic autocorrelation value calculator circuit 107. In the cyclic autocorrelation value calculator circuit 107, a cyclic autocorrelation value is calculated based on the following equation:

$$R_{xx}^{\alpha}(v) = \frac{1}{T_O} \sum_{i=0}^{T_0-1} x[i]x*[i+v]\exp(-j2\pi\alpha i), \qquad (1)$$

where $T_o$ is the observation time of a received signal, $x[i]$ is the sampled value of the received signal at a sampling timing i, * is a complex conjugate, v is any variable, $j=\sqrt{-1}$, and $\alpha$ is a cyclic frequency.

As shown by Eq. (1), only the sampled values of a received signal and the variables v and a are employed in calculating the cyclic autocorrelation value. Accordingly, when the radio communications transceiver 10 of a non-priority system calculates the cyclic autocorrelation value of a priority system included in a received signal, there is no need to utilize information such as the modulation method and the pilot symbol (training symbol) of the priority system, and the transceiver 10 can calculate the cyclic autocorrelation value of the priority system using the variables v and $\alpha$ depending only on the signal bandwidth of the priority system.

With respect to the cyclic autocorrelation value, if v=0 in Eq. (1), $x*[i]\exp(-2\pi\alpha i)$ in the right side may be considered as a signal in which $x[i]$ is shifted by the frequency $\alpha$. This cyclic autocorrelation value of the case of v=0 may be considered as representing the magnitude of the correlation between $x[i]$ and the signal in which $x[i]$ is frequency-shifted.

Figure 7:
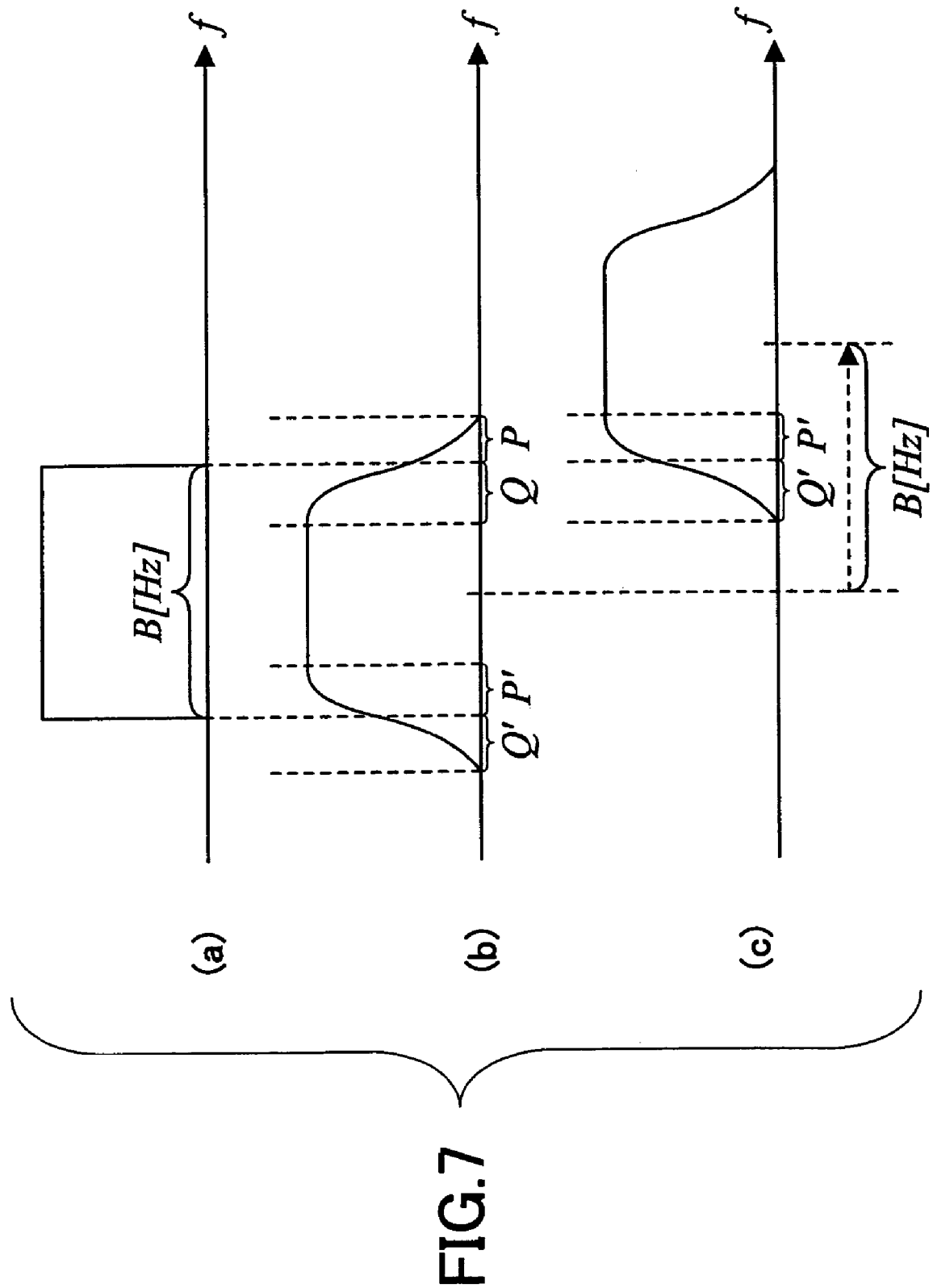
FIG. 7 is a diagram showing cyclic autocorrelation according to the first embodiment of the present invention.

Here, a description is given, with reference to FIG. 7, of the frequency correlation of a filter band limiting signal. In FIG. 7, (a) shows the frequency spectrum of a signal of a bandwidth B [Hz] subjected to band limiting using an ideal filter. In the case of using the ideal filter, it is possible to make a rectangular frequency spectrum. Practically, however, it is difficult to realize such a steep spectrum. Therefore, usually, a filter having a somewhat gentle frequency spectrum is employed for band limiting. In FIG. 7, (b) shows a frequency spectrum in the case of performing band limiting using a common practical filter. As shown in (b) of FIG. 7, compared with the case of employing the ideal filter, the frequency bandwidth widens with the common band limiting filter. In this widened frequency bandwidth, a region P extending to the right characteristically has the same signal component as a region P', and a region Q' extending to the left characteristically has the same signal component as a region Q. Accordingly, in the signal indicated by (c), which is a signal to which the signal of (b) is frequency-shifted by B [Hz], a part P' is the same signal component as the region P of (b) and a part Q' is the same signal component as the region Q of (b), so that a correlation exists. Thus, with respect to a signal subjected to band limiting with a filter, there is a correlation (cyclic autocorrelation) between the original signal and a signal in which the original signal is frequency-shifted. In this embodiment, it is determined, using this correlation, whether a received signal contains the signal of a priority system.

Figure 8:
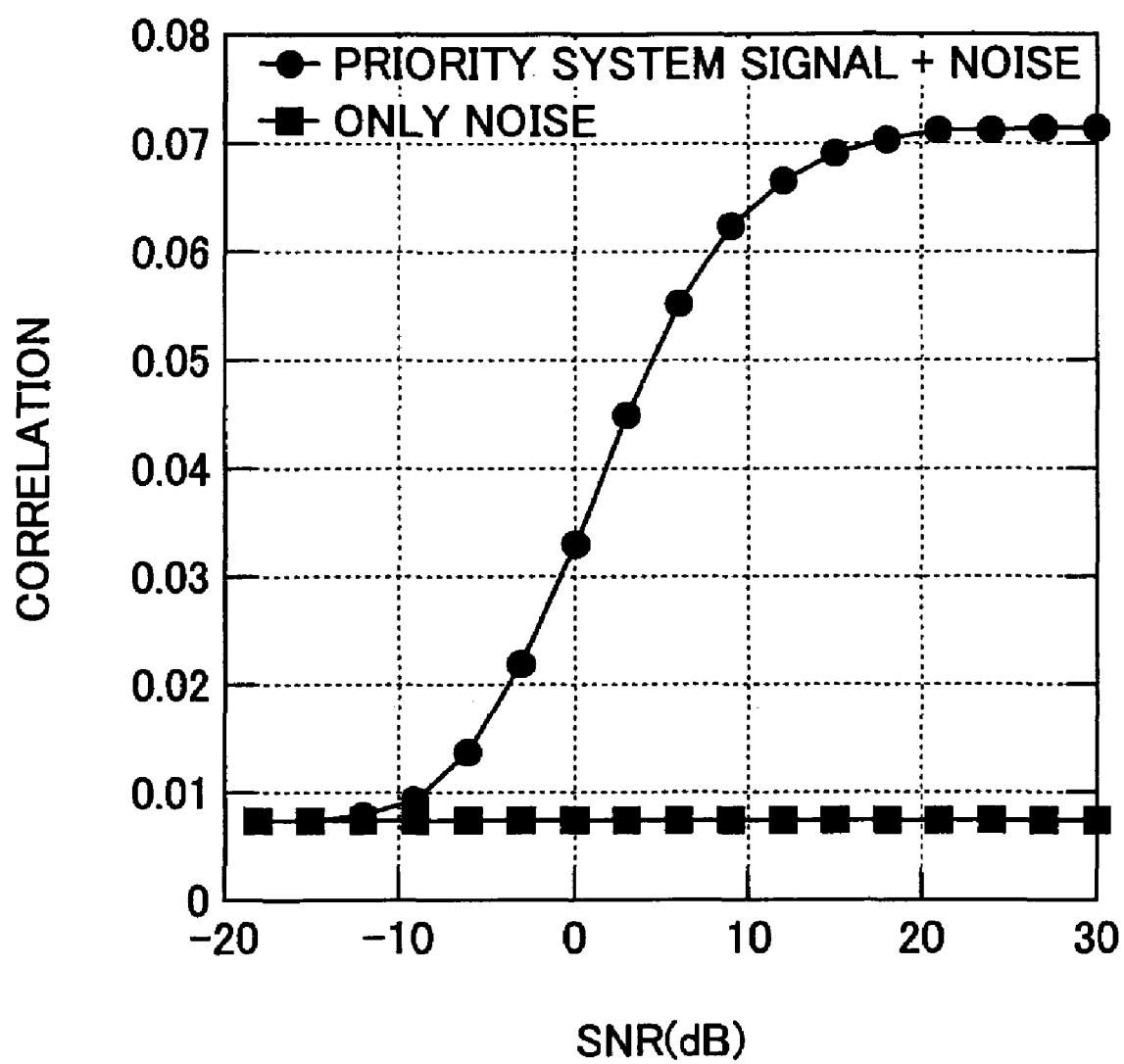
FIG. 8 is a graph showing the cyclic autocorrelation property of the signal of a priority system according to the first embodiment of the present invention.

FIG. 8 shows the cyclic autocorrelation value of the signal of a priority system in the case where the priority system signal is contained but a non-priority system signal is not contained in a received signal. The horizontal axis represents the SNR (Signal-to-Noise Ratio) of the received signal (the SNR of the priority system). The vertical axis represents a value obtained by normalizing a cyclic autocorrelation value calculated from Eq. (1) by the reception level. Here, it is assumed that the signal of the priority system is subjected to QPSK (Quadrature Phase Shift Keying) modulation and to band limiting with a root Nyquist filter with a roll-off factor of 0.5. The observation time $T_o$ is 4096 samples (=1024 symbols×4x oversampling), and the cyclic frequency α is $1/T_s$ ($T_s$=the symbol length of the priority system signal).

In the graph of FIG. 8, a value plotted with a solid circle is a cyclic autocorrelation value in the case where the priority system signal and a noise component are contained in the received signal, and a value plotted with a solid square is a cyclic autocorrelation value in the case where only the noise component is contained in the received signal. In the case where the signal component is contained in the received signal, the cyclic autocorrelation value increases as the SNR increases. On the other hand, in the case where only noise is contained, the cyclic autocorrelation value does not change. In the case of FIG. 8, with the SNR being −6 dB, the cyclic autocorrelation value is approximately 0.013 in the case where the signal component is contained, and is approximately 0.007 in the case where only the noise component is contained. Accordingly, for example, by presetting the cyclic autocorrelation threshold to 0.01, it is possible to determine whether the signal component of the priority system is contained in the received signal if the SNR of the priority system signal is greater than or equal to −6 dB. In the case of employing the conventional wireless LAN 802.11a standard, the noise level of a receiver is approximately −91 dBm, and the carrier sense level is −62 dBm. With this carrier sense level, transmission is authorized if the reception level is lower than or equal to −62 dBm according to the CSMA/CA procedure. That is, transmission is authorized if the SNR of the priority system is lower than or equal to approximately 29 dB (=−62 dBm−(−91 dBm)). On the other hand, in the case of employing this embodiment, as a result of setting the above-described cyclic autocorrelation value, transmission is authorized only if the SNR of the priority system is lower than or equal to approximately −6 dB. Accordingly, it is possible to reduce the effect of interference on the priority system.

Figure 9:
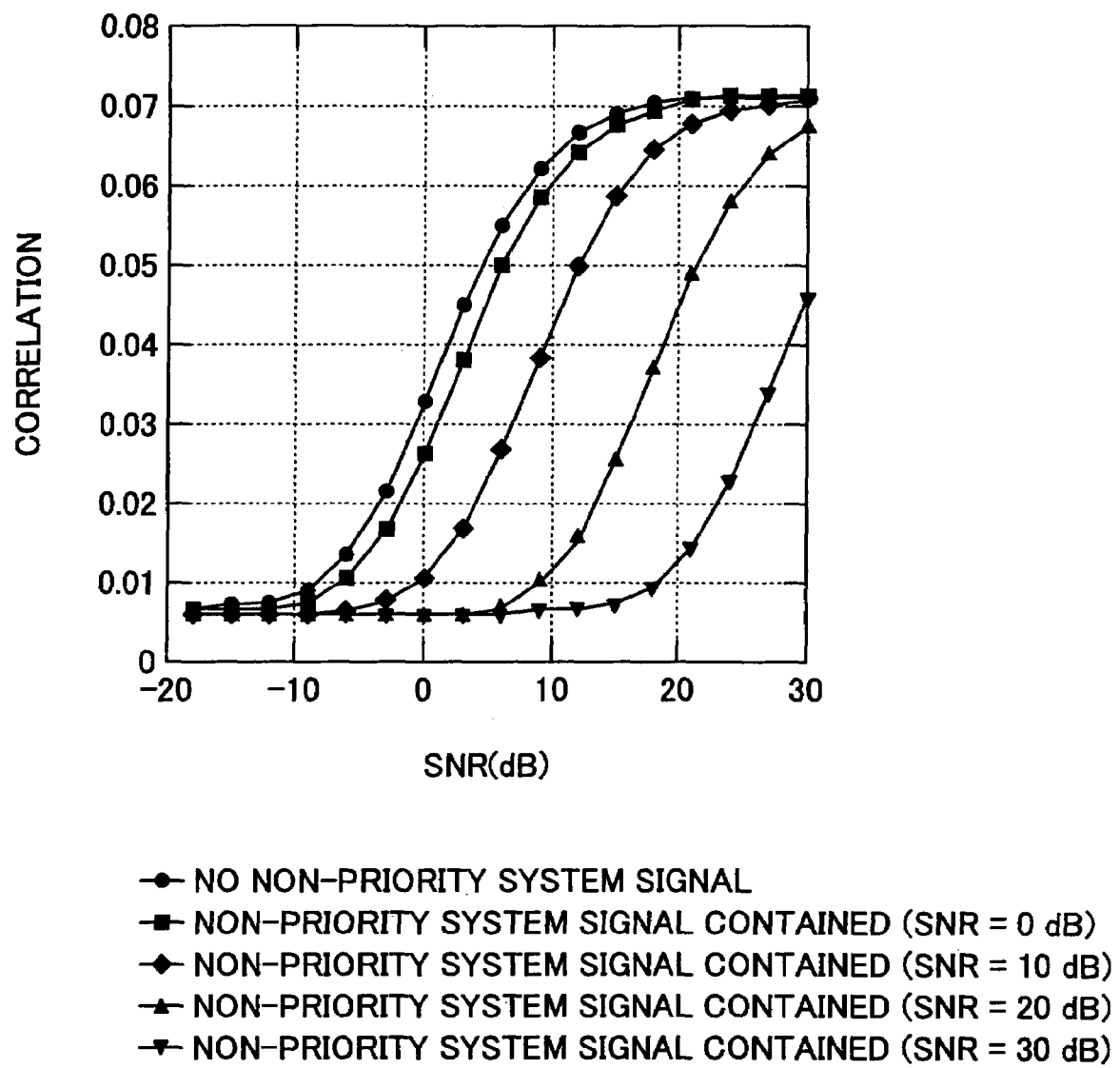
FIG. 9 is a graph showing the effect of the cyclic autocorrelation property of the priority system signal with respect to the SNR of a non-priority system signal according to the first embodiment of the present invention.

Next, FIG. 9 is a graph showing the cyclic autocorrelation property of the signal of a priority system in the case where the priority system signal and the signal of a non-priority system are contained in a received signal. Here, it is assumed that the non-priority system signal has a signal bandwidth twice the signal bandwidth of the priority system. It is also assumed that the non-priority system signal is subjected to QPSK modulation and thereafter to band limiting with a root Nyquist filter with a roll-off factor of 0.5. In FIG. 9, the horizontal axis represents the SNR of the priority system signal. FIG. 9 shows the cyclic autocorrelation property of the priority system signal using the SNR of the non-priority system signal as a parameter. As the SNR of the non-priority system signal increases, the cyclic autocorrelation.value of the priority system signal decreases. For example, if the cyclic autocorrelation threshold is 0.01 with the SNR of the non-priority system signal being 30 dB, it is possible to determine that the priority system signal is contained in the received signal if the SNR of the priority system signal is higher than or equal to 20 dB. According to the conventional CSMA/CA protocol, it is determined, using only the reception level, that the priority system signal exists if the SNR of the received signal is higher than or equal to 29 dB. However, by employing this embodiment, it is possible to detect inclusion of the priority system signal in the received signal also in the case where the SNR of the priority system signal is lower than or equal to 29 dB. By determining whether to authorize transmission based on this detection result, it is possible to reduce the interference caused to the priority system by the non-priority system. Further, if the received signal does not contain a priority system signal and contains only a non-priority system signal, it is determined, based on the reception level the same as conventionally, whether to authorize transmission. Accordingly, it is possible to perform transmission without reducing the transmission efficiency of the communications between non-priority systems.

Regarding this cyclic autocorrelation, as described with reference to FIG. 7, the correlation between a received signal and a signal in which the received signal is frequency-shifted by the signal bandwidth of a target signal is calculated. In the case of FIG. 7, it is possible to detect a target signal by calculating the correlation with a signal in which the received signal is frequency-shifted by B [Hz]. If the frequency shift is greater or less than B [Hz], no correlation is generated. Accordingly, even if the received signal contains the signals of multiple systems, if the systems use different signal bandwidths, it is possible to determine whether the signal of a priority system is contained in the received signal by calculating the cyclic autocorrelation value using the signal bandwidth of the priority system. Further, in the case where the signals of multiple priority systems are included within the received signal or the center carrier frequency of a priority system signal is unknown, cyclic autocorrelation is also generated so that it is possible to detect the priority system signal.

In the case of FIG. 7, the value of Eq. (1) is normalized by the reception level so as to be employed as a cyclic autocorrelation value. However, considering the fact that the magnitude of a reception signal is precontrolled to a fixed value by AGC (Automatic Gain Control) or the like, there is no need for normalization by the reception level, and it is possible to determine, using the value of Eq. (1) itself, whether the signal of a priority system is contained in the reception signal.

Further, the following value, obtained by complex-conjugating the right side of Eq. (1), may be employed as a cyclic autocorrelation value.

$$R_{xx^*}^{\alpha}(v) = \frac{1}{T_O} \sum_{i=0}^{T_0-1} x[i]x[i+v]\exp(-j2\pi\alpha i). \quad (2)$$

Depending on the signal format of the priority system, Eq. (1) or Eq. (2) is employed, and the specific cyclic frequency α and the variable v that cause a peak of cyclic autocorrelation in the signal format are employed. For example, $\alpha=1/T_s$ and $v=0$ ($T_s$: symbol length) may be employed in a single-carrier TDMA signal, $\alpha=1/T_c$ and $v=0$ ($T_c$: chip length) may be employed in a CDMA signal, and $\alpha=0$ and $v=T_d$ ($T_d$: an OFDM symbol length excluding a guard interval) may be employed in an OFDM signal. The values of α and v in all systems that can be included in a received signal as priority systems are stored, and it is estimated whether each priority system is included in the received signal by calculating its cyclic autocorrelation value using the corresponding values.

Second Embodiment

Next, a description is given of a method of determining, by a chi-square test using a cyclic autocorrelation value, whether the signal of a priority system is contained in a received signal according to a second embodiment of the present invention. The transceiver 10 of FIG. 4 is also employable in this case. The data transmission authorization part 109 determines whether to authorize data transmission based on a measured level of a reception signal and the result of conducting the chi-square test using a cyclic autocorrelation value.

Figure 10:
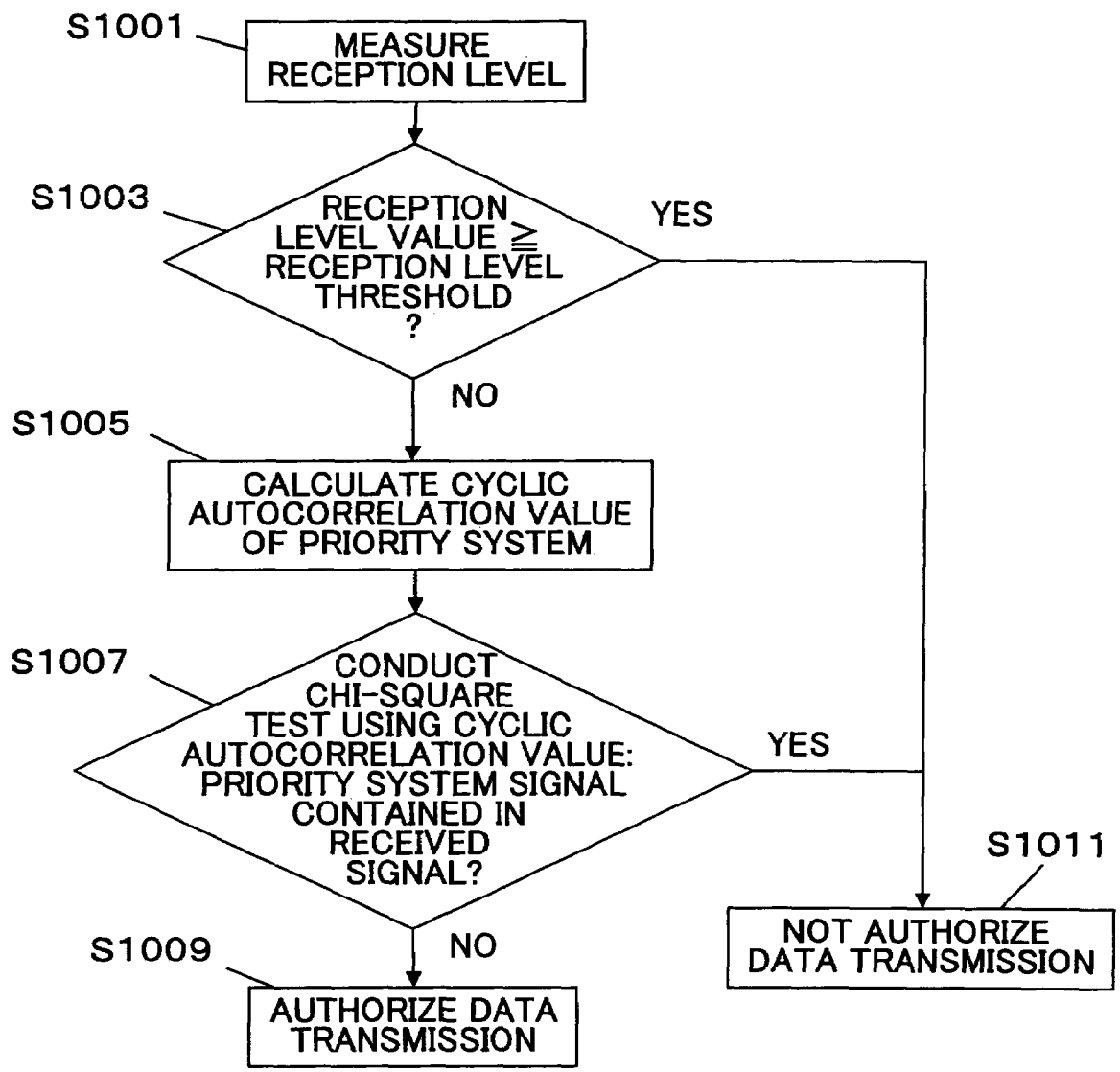
FIG. 10 is a flowchart showing a control procedure in the transceiver according to the second embodiment of the present invention.

FIG. 10 is a flowchart showing a control procedure according to this embodiment. As in the first embodiment, first, in step S1001, the level of a received signal is measured, and in step S1003, the reception level value of the received signal is compared with a reception level threshold. If the measured reception level value is greater than or equal to the reception level threshold (YES in step S1003), in step S1011, data transmission is not authorized. If the measured reception level value is less than the reception level threshold (NO in step S1003), in step S1005, the cyclic autocorrelation value of a priority system is calculated. Next, in step S1007, it is determined, by performing hypothesis testing using the cyclic autocorrelation value, it is determined whether the signal of the priority system is contained in the received signal. As a result of the determination, if the priority system signal is contained in the received signal (YES in step S1007), in step S1011, data transmission is not authorized. On the other hand, if the priority system signal is not contained in the received signal (NO in step S1007), in step S1009, data transmission is authorized.

In the chi-square test using a cyclic autocorrelation value, it is possible to employ the method shown in Reference 2. According to this method, a test statistic value is calculated using the cyclic autocorrelation value of a priority system signal, and the fact that the test statistic value follows a chi-square distribution is used. The calculated test statistic value and a chi-square value at a preset rejection rate are compared. If the calculated test statistic value is greater than the chi-square value, it is determined that the priority system signal is contained in the received signal. If the calculated test statistic value is less than the chi-square value, it is determined that the priority system signal is not contained in the received signal. Here, the rejection rate represents the probability of erroneously determining that the priority system signal is contained in the received signal although the priority system signal is not contained in the received signal.

Figure 11:
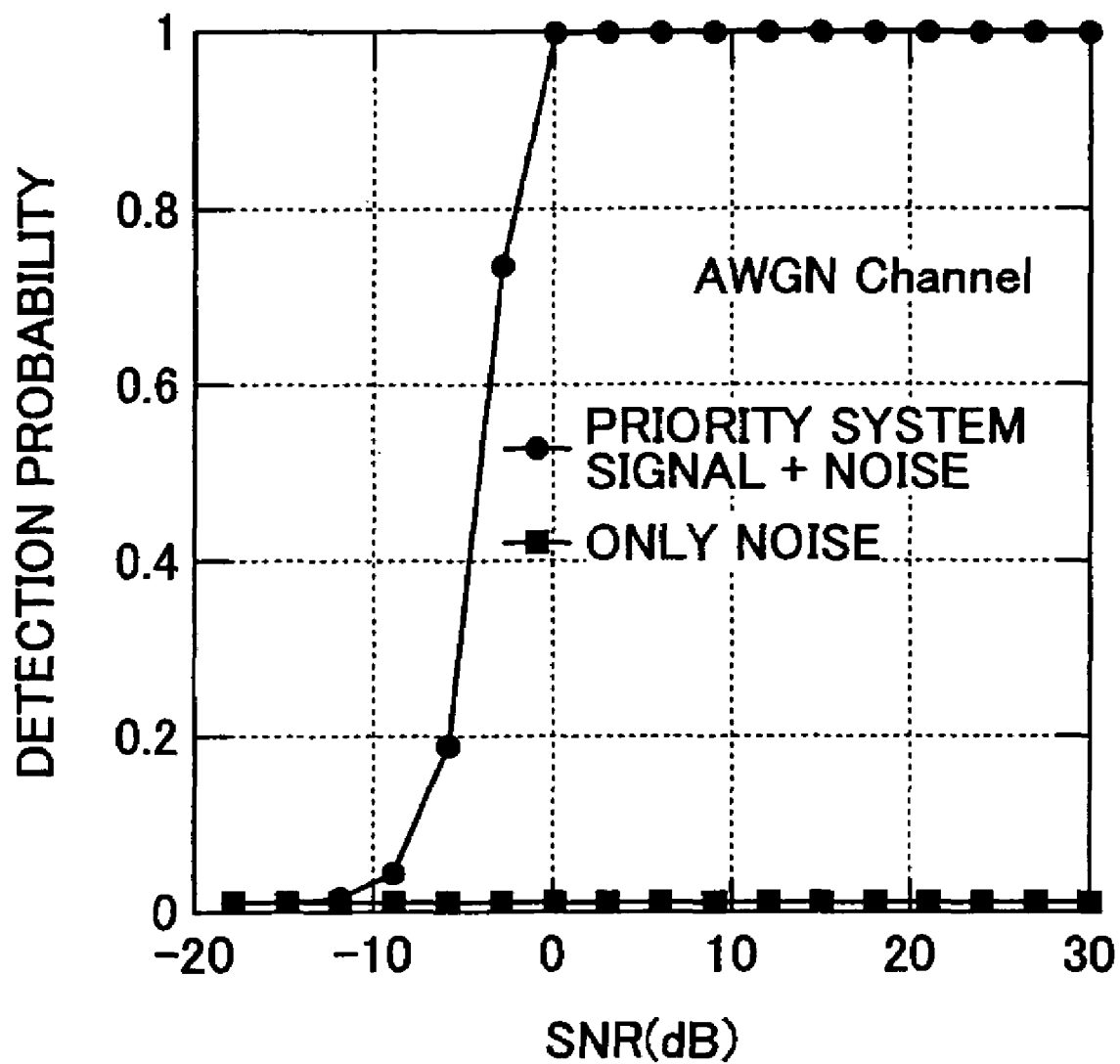
FIG. 11 is a graph showing the detection probability of a priority system signal by a chi-square test according to the second embodiment of the present invention.

FIG. 11 is a graph showing the detection probability of the signal of a priority system according to the chi-square test in the case where the signal of the priority system is contained but a non-priority system signal is not contained in a received signal. The horizontal axis represents the SNR (Signal-to-Noise Ratio) of the received signal (the SNR of the priority system). The vertical axis represents a detection probability. Here, it is assumed that the priority system signal is subjected to QPSK modulation and to band limiting with a root Nyquist filter with a roll-off factor of 0.5. The observation time $T_o$ is assumed to be 4096 samples (=1024 symbols×4x oversampling), and the cyclic frequency α is assumed to be $1/T_s$ ($T_s$=the symbol length of the priority system signal). It is also assumed that the rejection rate in the chi-square test is 5%.

In the graph of FIG. 11, a value plotted with a solid circle is a detection probability in the case where the priority system signal and a noise component are contained in the received signal, and a value plotted with a solid square is a detection probability in the case where only the noise component is contained in the received signal. In the case where the signal component is contained in the received signal, the detection probability increases as the SNR increases. On the other hand, in the case where only noise is contained, the detection probability does not change. In the case of FIG. 11, the detection probability is 100% if the SNR of the priority system signal is higher than or equal to 0 dB. Accordingly, if the SNR of the priority system signal is higher than or equal to 0 dB, it is possible to determine whether the signal component of the priority system is contained in the received signal. In the case of employing the wireless LAN 802.11a standard, transmission is authorized if the SNR of the priority system is lower than or equal to approximately 29 dB as illustrated in the first embodiment. On the other hand, in the case of employing this embodiment, transmission is authorized only if the SNR of the priority system is lower than approximately 0 dB. Accordingly, it is possible to reduce the effect of interference on the priority system.

Figure 12:
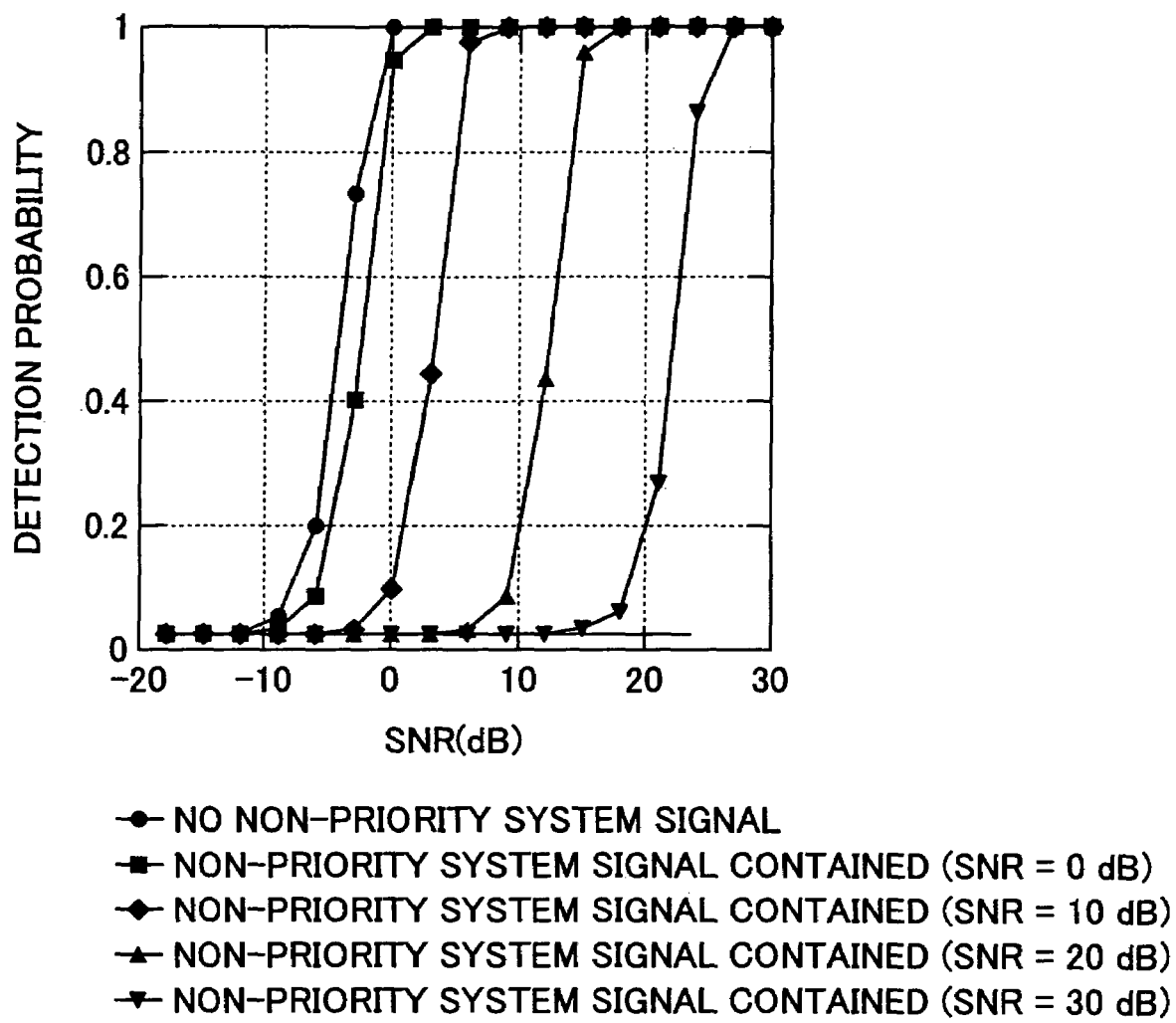
FIG. 12 is a graph showing the effect of the detection probability of the priority system signal with respect to the SNR of a non-priority system signal according to the second embodiment of the present invention.

Next, FIG. 12 is a graph showing the detection probability of the signal of a priority system in the case where the priority system signal and the signal of a non-priority system are contained in a received signal. The non-priority system signal has a signal bandwidth twice the signal bandwidth of the priority system. It is assumed that the non-priority system signal is subjected to QPSK modulation and thereafter to band limiting with a root Nyquist filter with a roll-off factor of 0.5. In FIG. 12, the horizontal axis represents the SNR of the priority system signal. FIG. 12 shows the detection probability of the priority system signal using the SNR of the non-priority system signal as a parameter. As the SNR of the non-priority system signal increases, the detection probability of the priority system signal decreases. For example, in the case where the SNR of the non-priority system signal is 20 dB, if the SNR of the priority system signal is higher than or equal to 18 dB, the detection probability is 100% so that it is possible to determine that the priority system signal is contained in the received signal. According to the CSMA/CA protocol, it is determined, using only the reception level, that the priority system signal exists if the SNR of the received signal is higher than or equal to 29 dB. However, by employing this embodiment, it is possible to detect inclusion of the priority system signal in the received signal also in the case where the SNR of the priority system signal is lower than 29 dB. By determining whether to authorize transmission based on this detection result, it is possible to reduce the interference caused to the priority system by the non-priority system. Further, if the received signal does not contain a priority system signal and contains only a non-priority system signal, it is determined, based on the reception level the same as conventionally, whether to authorize transmission. Accordingly, it is possible to perform transmission without reducing the transmission efficiency of the communications between non-priority systems.

Third Embodiment

Figure 13:
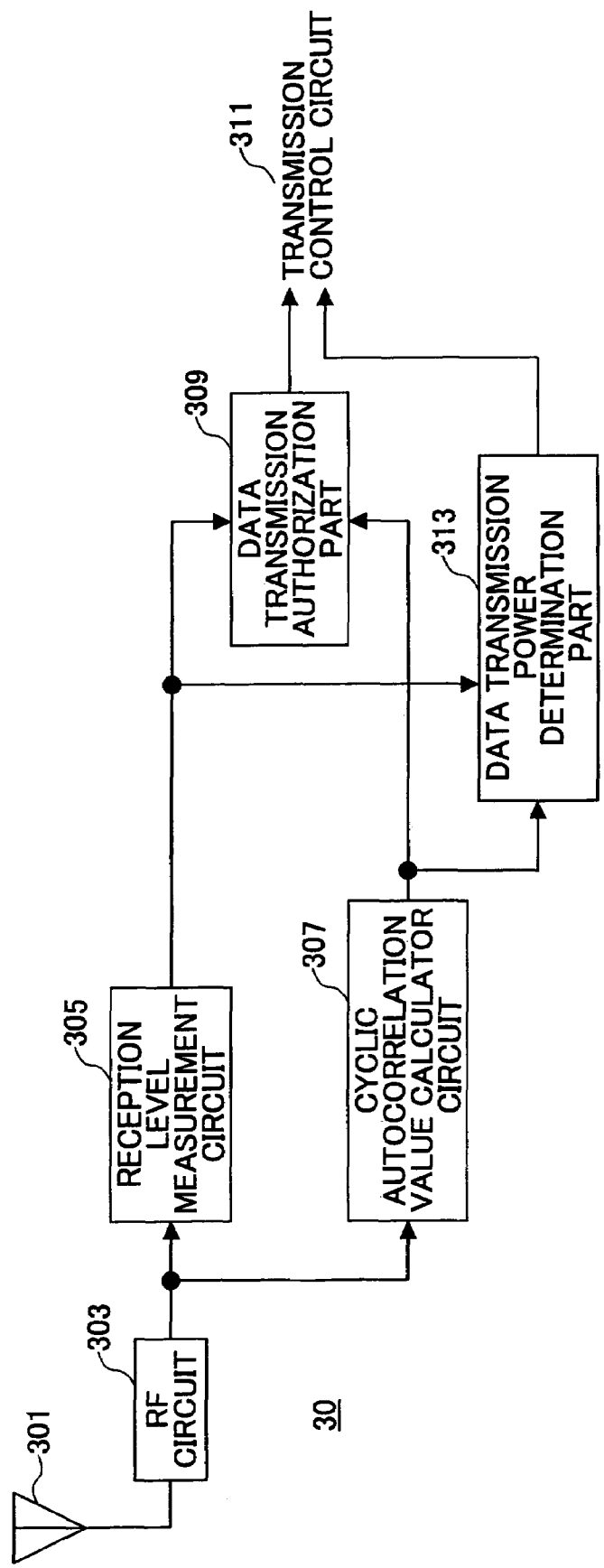
FIG. 13 is a block diagram showing a transceiver according to a third embodiment of the present invention.

Next, a description is given, with reference to FIG. 13, of a method of further reducing interference with a priority system by controlling the transmission power of a non-priority system in the case where the non-priority system is authorized to perform transmission by the method of the first or second embodiment according to a third embodiment of the present invention. FIG. 13 is a block diagram showing a transceiver 30 of a non-priority system according to the third embodiment. Like the transceiver 10 of FIG. 4, the transceiver 30 includes an antenna 301, an RF circuit 303, a reception level measurement circuit 305, a cyclic autocorrelation value calculator circuit 307, and a data transmission authorization part 309. These components operate in the same manner as the corresponding components of the transceiver 10. The transceiver 30 further includes a data transmission power determination part 313 that controls transmission power for data transmission using a cyclic autocorrelation value or a test statistic value calculated using the cyclic autocorrelation value.

In this non-priority system transceiver 30, as in the transceiver 10, first, a reception level is measured using a received signal in the reception level measurement circuit 305, a cyclic autocorrelation value is calculated in the cyclic autocorrelation value calculator circuit 307, and it is determined, in the data transmission authorization part 309, whether to authorize data transmission. If it is determined that data transmission be authorized the data transmission power determination part 313 controls transmission power for data transmission using the cyclic autocorrelation value or a test statistic value calculated using the cyclic autocorrelation value. The result of this transmission power control is fed to a transmission control circuit 311 together with the result of the data transmission authorization.

As shown in FIG. 8, if the SNR of a priority system is high, its cyclic autocorrelation value is also high. Accordingly, if the calculated cyclic autocorrelation value is high, it is possible to reduce interference with the priority system by reducing the data transmission power of a non-priority system. On the other hand, if the cyclic autocorrelation value is small, the effect of interference on the priority system is also considered small. Accordingly, it is possible to improve the quality of the communications between non-priority systems by increasing the data transmission power. Further, like the cyclic autocorrelation value, the test statistic value calculated in conducting the chi-square test is also high if the SNR of the priority system is high. Accordingly, the test statistic value may be employed in place of the cyclic autocorrelation value.

Fourth Embodiment

Figure 14:
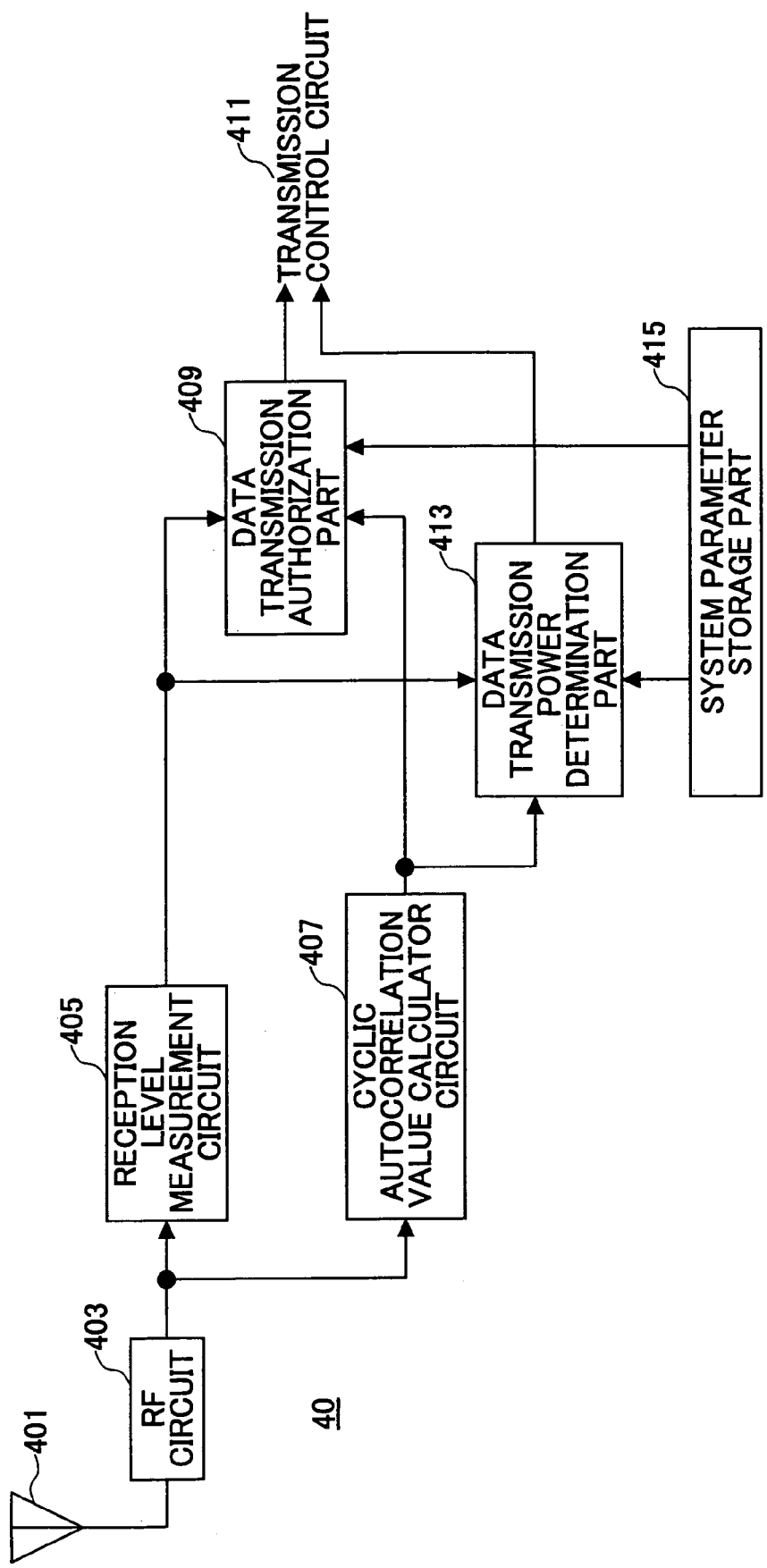
FIG. 14 is a block diagram showing a transceiver according to a fourth embodiment of the present invention.

Next, a description is given, with reference to FIG. 14, of a method of adaptively controlling a threshold for determining whether to authorize data transmission and the magnitude of data transmission power based on the difference between types of priority systems included in a received signal according to a fourth embodiment of the present invention. FIG. 14 is a block diagram showing a transceiver 40 according to the fourth embodiment. Here, by way of example, it is assumed that three types of systems A, B, and C use the same band. Further, the system A has the highest priority, and their priorities are preset in order of A>B>C. Here, a description is given of a control method in the system C.

Like the transceiver 10 of FIG. 4, the transceiver 40 of the system C includes an antenna 401, an RF circuit 403, a reception level measurement circuit 405, a cyclic autocorrelation value calculator circuit 407, and a data transmission authorization part 409. These components operate in the same manner as the corresponding components of the transceiver 10. The transceiver 40 further includes a system parameter storage part 415 that retains cyclic autocorrelation thresholds or chi-square values used for the chi-square test for the signals of the multiple priority systems (systems A and B).

In this transceiver 40 of the system C, as in the transceiver 10 of FIG. 4, first, a reception level is measured using a received signal, and it is determined that data transmission should not be authorized if the reception level is higher than or equal to a reception level threshold. If the reception level is lower than the reception level threshold, the cyclic autocorrelation value of the system B and the cyclic autocorrelation value of the system A are calculated in the cyclic autocorrelation value calculator circuit 407. Using the calculated cyclic autocorrelation values, the data transmission authorization part 409 determines whether to authorize data transmission. As described above, whether to authorize data transmission is determined by comparing a cyclic autocorrelation value and a cyclic autocorrelation threshold. If the cyclic autocorrelation threshold is set to a low value, it is possible not to authorize data transmission even in the case where a weak signal of a priority system is contained in a received signal, so that it is possible to reduce interference with the priority system. On the other hand, if the cyclic autocorrelation threshold is set to a high value, it is possible to authorize the data transmission of a non-priority system with a certain degree of allowance of its interference with the priority system, so that it is possible to increase the data transmission opportunities of the non-priority system. Thus, by setting the cyclic autocorrelation threshold, it is possible to control reduction in interference with a priority system and an increase in the transmission opportunities of a non-priority system in a trade-off relationship.

Therefore, in the transceiver 40 of the system C, the system parameter storage part 415 retains a cyclic autocorrelation threshold for the signal of the system A and a cyclic autocorrelation threshold for the signal of the system B. The cyclic autocorrelation threshold for the signal of the system A having the highest priority is set to a low value in order to reduce as much interference caused to the system A by the system C as possible. With respect to the signal of the system B having the next highest priority, the cyclic autocorrelation threshold is set to be higher than that for the system A in order to provide the system C with more transmission opportunities. As a result of providing settings in this manner, the data transmission authorization part 409 can determine whether to authorize data transmission in view of the difference in priority between the systems A and B. A transmission control circuit 411 is notified of this determination result.

Further, like the transceiver 30 of FIG. 13, the transceiver 40 may include a data transmission power determination part 413. In this case, the data transmission power determination part 413 sets a low data transmission power level if the signal of the system A having the highest priority is contained in the received signal, and sets a higher data transmission power level if the signal of the system B having the next highest priority is contained in the received signal. As a result of providing settings in this manner, it is possible to reduce the system C's interference with the system A when the signal of the system A is contained in the received signal. Further, it is possible to improve the communications quality of the system C itself by allowing its interference with the system B to a certain extent when the signal of the system B is contained in the received signal. Thus, by setting the cyclic autocorrelation threshold system by system, it is possible to determine data transmission power in view of order of priority.

In this embodiment, a description is given above of the method in the case of performing control using a cyclic autocorrelation value in the data transmission authorization part 409 and the data transmission power determination part 413. Alternatively, it is also possible to substitute the test statistic value described in the second embodiment. In this case, the chi-square value to be compared with the test statistic value is changed based on the order of priority of systems. Further, it is also possible to produce the same effect by changing the rejection rate of the chi-square value based on the order of priority of systems.

Fifth Embodiment

Figure 15:
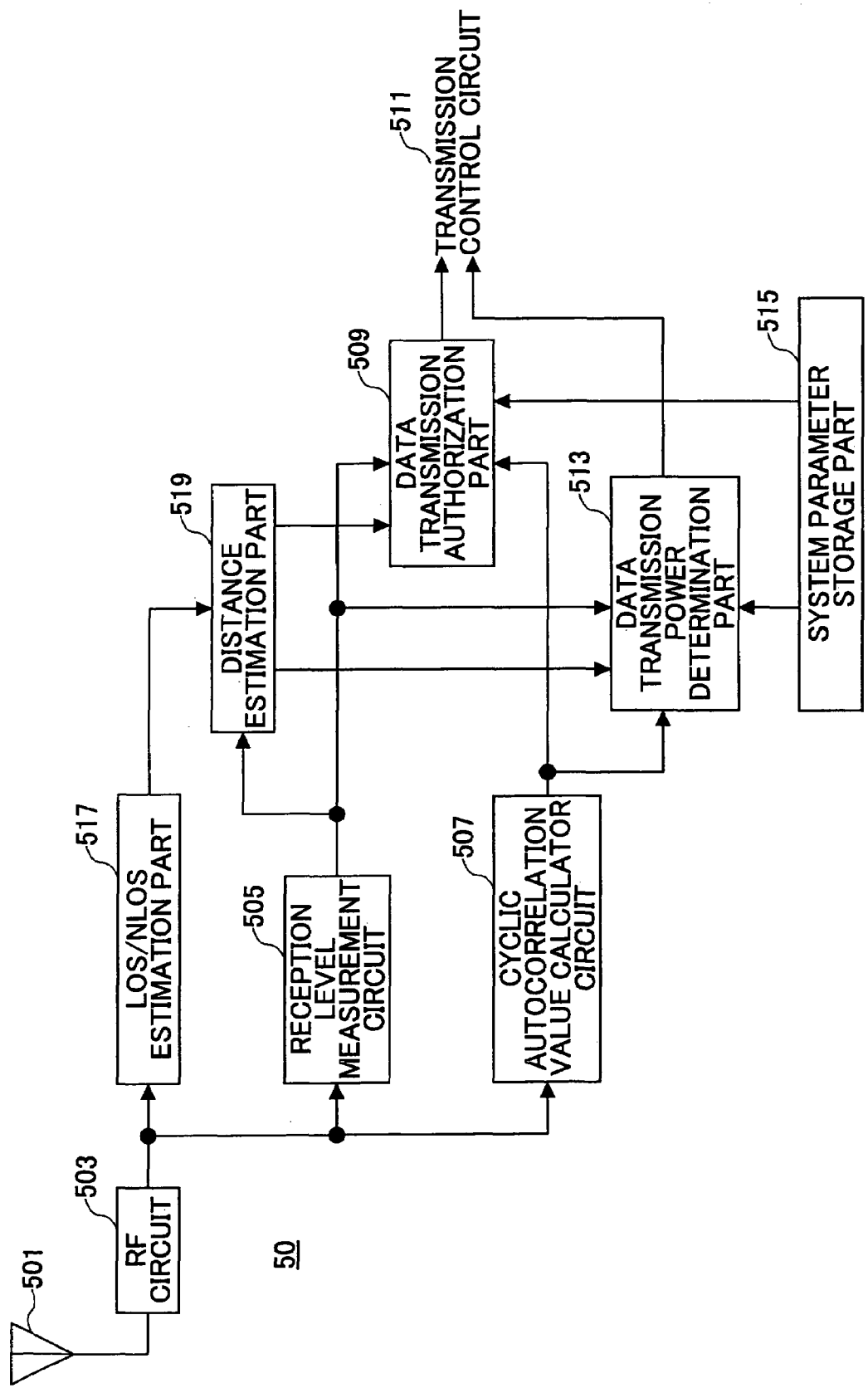
FIG. 15 is a block diagram showing a transceiver according to a fifth embodiment of the present invention.

Next, a description is given below, with reference to FIG. 15, of a method of performing data transmission in view of the area of a priority system according to a fifth embodiment of the present invention. FIG. 15 is a block diagram showing a transceiver 50 according to the fifth embodiment. In this embodiment, the transceiver 50 of a non-priority system estimates whether the transmission antenna of a priority system is in a LOS (Line Of Sight) environment or in an NLOS (Non Line Of Sight) environment from the transceiver 50 of the non-priority system. Using the estimation results and a reception level, the transceiver 50 estimates the distance from the transmitter of the priority system. By determining whether to authorize data transmission using the estimated distance, it is possible to determine whether to authorize data transmission in view of the area of the priority system. Like the transceiver 10 of FIG. 4, the transceiver 50 includes an antenna 501, an RF circuit 503, a reception level measurement circuit 505, a cyclic autocorrelation value calculator circuit 507, and a data transmission authorization part 509. These components operate in the same manner as the corresponding components of the transceiver 10. The transceiver 50 further includes a LOS/NLOS estimation part 517 that estimates whether the transmission antenna of a priority system is in a LOS environment or in an NLOS environment, and a distance estimation part 519 that estimates the distance from the transmission antenna of the priority system.

Figure 16:
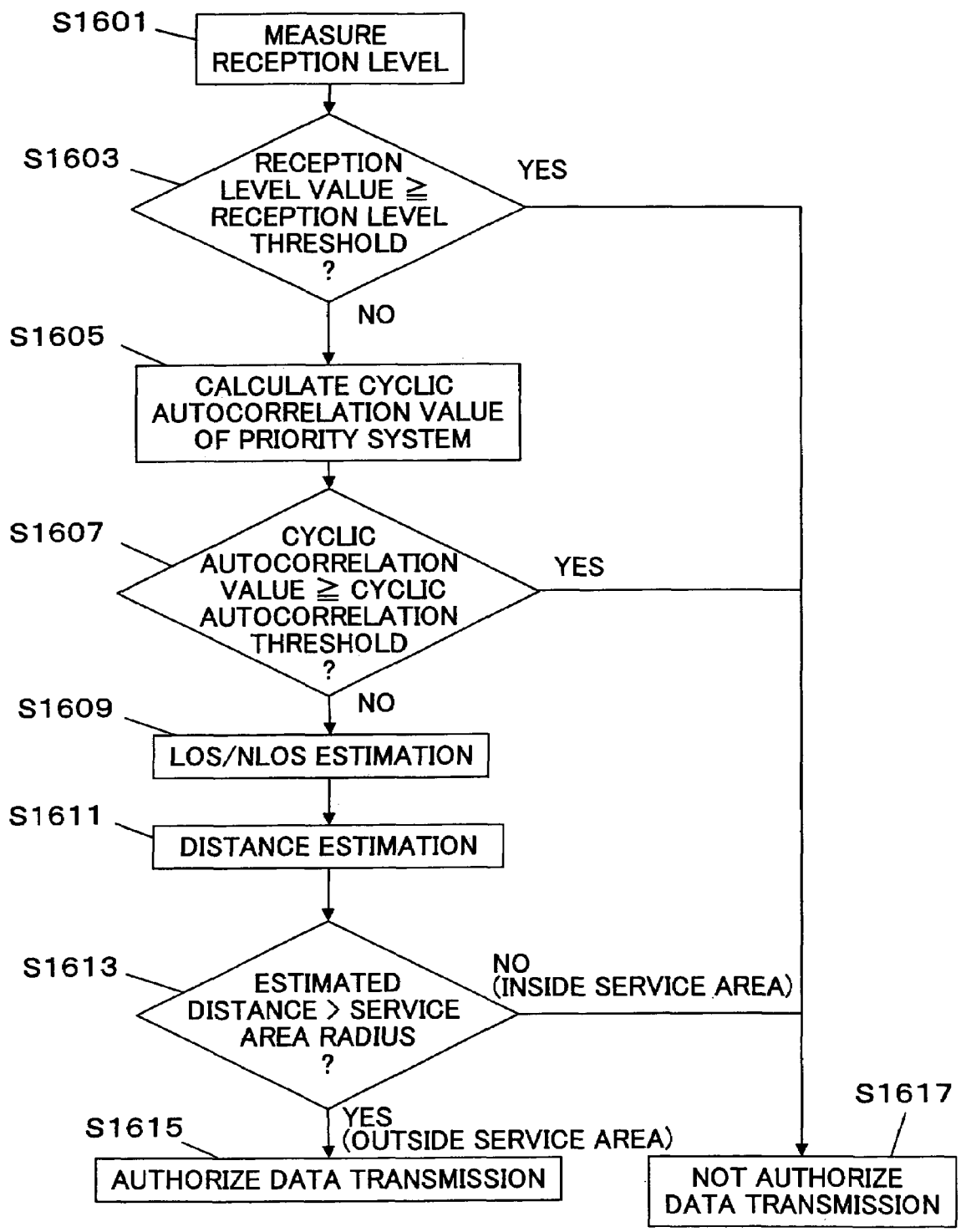
FIG. 16 is a flowchart showing a control procedure in the transceiver according to the fifth embodiment of the present invention.

FIG. 16 is a flowchart showing a control procedure in the transceiver 50. Like the transceiver 10, first, in step S1601, a reception level is measured using a received signal in the reception level measurement circuit 505, and in step S1603, the measured reception level is compared with a reception level threshold. If the measured reception level is higher than or equal to the reception level threshold (YES in step S1603), in step S1617, it is determined that data transmission should not be authorized. If the measured reception level is lower than the reception level threshold (NO in step S1603), in step S1605, the cyclic autocorrelation calculator circuit 507 calculates a cyclic autocorrelation value. In step S1607, the calculated cyclic autocorrelation value is compared with a cyclic autocorrelation threshold. If the calculated cyclic autocorrelation value is greater than or equal to the cyclic autocorrelation threshold (YES in step S1607), in step S1617, it is determined that data transmission should not be authorized. If the calculated cyclic autocorrelation value is less than the cyclic autocorrelation threshold (NO in step S1607), in step S1609, the LOS/NLOS estimation part 517 estimates, from the frequency response, temporal variation, etc., of a propagation channel in the received signal, whether the transmitter of the priority system is in a LOS environment or in an NLOS environment. In the case of employing the frequency response in this estimation, if the frequency response is not flat and has selectivity, the propagation channel has a large delay spread, so that the received signal can be estimated to be in an NLOS environment. In the case of employing the temporal variation of the received signal, the received signal can be estimated to be in a LOS environment if the temporal variation is great, and that the received signal is in an NLOS environment if the temporal variation is small. After thus estimating whether the signal of the priority system is in a LOS environment or in an NLOS environment, in step S1611, using the reception level value calculated in the reception level measurement circuit 505, the distance estimation part 519 estimates the distance from the transmitter of the priority system. In this distance estimation, the following is employed. In general, if a received signal is in a LOS environment, the signal power of the received signal attenuates in proportion to the square of the distance between a transmitter and a receiver. On the other hand, if a received signal is in an NLOS environment, the signal power of the received signal attenuates in proportion to the fourth power of the distance between a transmitter and a receiver. That is, it is possible to estimate the distance from the transmitter of the priority system by prestoring the transmission power level of the transmitter of the priority system and using the actually measured reception level and the result of estimation as to whether the received signal is in a LOS environment or in an NLOS environment. In step S1613, using (comparing) this estimated distance and the prestored service area radius of the priority system, it is determined whether the transceiver 50 is within the service area range of the priority system. If the estimated distance is less than or equal to the prestored service area radius (NO in step S1613), in step S1617, the data transmission authorization part 509 determines that data transmission should not be authorized. That is, it is determined that data transmission is not authorized also in the case where the cyclic autocorrelation value is less than the cyclic autocorrelation threshold but the transceiver 50 is within the service area range of the priority system. On the other hand, if the estimated distance is greater than the prestored service area radius (YES in step S1613), in step S1615, the data transmission authorization part 509 determines that data transmission should be authorized. That is, it is determined that data transmission should be authorized if the cyclic autocorrelation value is less than the cyclic autocorrelation threshold and the transceiver 50 is out of the service area range of the priority system. As a result, it is possible to determine whether to authorize data transmission in view of the service area of the priority system, and it is possible to reduce interference with the priority system.

Like the transceiver 30 of FIG. 13, the transceiver 50 may include a data transmission power determination part 513. In this case, after it is determined that data transmission should be authorized, the data transmission power determination part 513 determines transmission power based on the cyclic autocorrelation value and the estimated distance from the transmitter of the priority system. For example, if the cyclic autocorrelation value is large, a low data transmission power level is set in order to reduce interference with the priority system as in the third embodiment. However, in the fifth embodiment, a low data transmission power level is set also in the case of a small cyclic autocorrelation value if the distance from the priority system transmitter is short. A high data transmission power level is set if the cyclic autocorrelation value is small and the distance from the priority system transmitter is long. By thus providing settings, it is possible to control data transmission power in view of the service area of a priority system. Accordingly, it is possible to reduce interference with the priority system with efficiency, and at the same time, it is possible to improve the quality of the communications between non-priority systems.

Further, like the transceiver 40 of FIG. 14, the transceiver 50 may include a system parameter storage part 515. In the case where there are multiple systems of varying priority, the system parameter storage part 515 makes it possible to determine whether to authorize data transmission or determine data transmission power also in view of the difference in priority between the priority systems at the same time.

In this embodiment, a description is given above of the method of performing control using a cyclic autocorrelation value. Alternatively, it is also possible to employ the test statistic value calculated in conducting the chi-square test using the cyclic autocorrelation value.

According to one embodiment of the present invention, a controller in a transceiver for radio communications in which the same frequency is shared between multiple communications systems is provided that includes: a cyclic autocorrelation value calculation part configured to calculate the cyclic autocorrelation value of a first one of the communications systems from a received signal; and a data transmission authorization part configured to determine whether to authorize data transmission in a second one of the communications systems based on the calculated cyclic autocorrelation value of the first one of the communications systems.

According to this controller, the data transmission of a non-priority system (second communications system) is not authorized if the signal of a priority system (first communications system) is contained in a received signal.

Additionally, in the controller, the cyclic autocorrelation value calculation part may calculate the cyclic autocorrelation value of the first one of the communications systems when the level of the received signal is lower than a threshold.

This controller can determine an allowable area of overlapping by a preset reception level threshold in the communications between non-priority systems. Accordingly, it is possible to reduce the effect of the non-priority system on the priority system, and at the same time, it is possible to prevent reduction in the efficiency of the communications between the non-priority systems.

Additionally, the controller may further include a reception level measurement part configured to measure a level of the received signal, wherein the data transmission authorization part may determine whether to authorize the data transmission in the second one of the communications systems based on at least one of the measured level of the received signal and the calculated cyclic autocorrelation value of the first one of the communications systems.

In the case where the signal of the priority system is contained in the received signal, the controller does not authorize the data transmission of the non-priority system, either, if the reception level is lower than the reception level threshold. Accordingly, in a frequency coexistence environment where multiple systems share the same frequency band, it is possible to reduce the non-priority system's interference with a priority system. On the other hand, in the case where the priority system signal is not contained in the received signal, the data transmission is authorized if the reception level is lower than the reception level threshold. Accordingly, it is possible to maintain the efficiency of the communications between non-priority systems.

Additionally, the controller may further include a data transmission power determination part configured to control transmission power of the data transmission in the second one of the communications systems based on the calculated cyclic autocorrelation value of the first one of the communications systems.

In the case of data transmission, the controller can control data transmission power based on the magnitude of the priority system signal contained in the received signal. Accordingly, it is possible to reduce interference with the priority system.

Additionally, the controller may further include: a LOS/NLOS estimation part configured to estimate whether the transmitter of the first one of the communications systems is in a LOS environment or in an NLOS environment; and a distance estimation part configured to estimate the distance from the transmitter of the first one of the communications systems to the transceiver for radio communications using the result of the estimation of the LOS/NLOS estimation part and the measured level of the received signal, wherein the data transmission authorization part may estimate whether the transceiver for radio communications is within the service area of the first one of the communications systems by comparing the distance estimated in the distance estimation part and the service area of the first one of the communications systems, and may determine whether to authorize the data transmission in the second one of the communications systems based on the result of the estimation and the calculated cyclic autocorrelation value of the first one of the communications systems.

This controller makes it possible to determine whether to authorize data transmission in view of the service area of the priority system. As a result, it is possible to reduce interference with the priority system.

Additionally, in the controller, the data transmission power determination part may control the transmission power of the data transmission in the second one of the communications systems based on the distance estimated in the distance estimation part and the calculated cyclic autocorrelation value of the first one of the communications systems.

This controller makes it possible to control data transmission power in view of the service area of the priority system. Accordingly, it is possible to efficiently reduce interference with the priority system, and at the same time, improve the quality of the communications between non-priority systems.

Additionally, in the controller, the data transmission authorization part may determine whether to authorize the data transmission in the second one of the communications systems based on the result of a chi-square test using the calculated cyclic autocorrelation value of the first one of the communications systems.

Additionally, in the controller, the cyclic autocorrelation value may be obtained by determining the correlation between an original signal and a signal in which the original signal is frequency-shifted.

According to one embodiment of the present invention, a radio communications transmission and reception method in a transceiver for radio communications in which the same frequency is shared between multiple communications systems is provided that includes the steps of: (a) calculating the cyclic autocorrelation value of a first one of the communications systems from a received signal; (b) determining whether to authorize data transmission in a second one of the communications systems based on the calculated cyclic autocorrelation value of the first one of the communications systems; and (c) performing the data transmission based on a determination in said step (b) that the data transmission should be authorized.

Thus, according to one embodiment of the present invention, in a frequency coexistence environment where multiple systems share the same frequency band, it is possible to reduce the effect of a non-priority system on a priority system without decreasing the efficiency of the communications between non-priority systems.

A controller and a radio communications transmission and reception method in a transceiver for radio communications according to one embodiment of the present invention are also applicable in the case where a non-priority system performs communications using carrier sensing of CSMA, etc., with the existing broadcasting such as ground-wave digital television or radio communications including mobile communications such as PDC, PHS, and W-CDMA being a priority system.

The present invention is not limited to the specifically disclosed embodiments, and variations and modifications may be made without departing from the scope of the present invention.

The present application is based on Japanese Priority Patent Application No. 2005-033337, filed on Feb. 9, 2005, the entire contents of which are hereby incorporated by reference.

What is claimed is:

1. A controller in a transceiver for radio communications in which a same frequency is shared between a plurality of communications systems, comprising:
a reception level measurement part which measures a level of a received signal;
a cyclic autocorrelation value calculation part which calculates a cyclic autocorrelation value of a first one of the communications systems from the received signal only when the measured level of the received signal is lower than a threshold; and
a data transmission authorization part which determines whether to authorize data transmission in a second one of the communications systems based on at least one of the measured level of the received signal and the calculated cyclic autocorrelation value of the first one of the communications systems.

2. The controller as claimed in claim 1,
wherein the data transmission authorization part determines whether to authorize the data transmission in the second one of the communications systems based on both of the measured level of the received signal and the calculated cyclic autocorrelation value of the first one of the communications systems.

3. The controller as claimed in claim 2, further comprising:
a LOS/NLOS (Line of Sight)/(Non Line of Sight) estimation part which estimates whether a transmitter of the first one of the communications systems is in a LOS environment or in an NLOS environment; and
a distance estimation part which estimates a distance from the transmitter of the first one of the communications systems to the transceiver for the radio communications using a result of the estimation of the LOS/NLOS estimation part and the measured level of the received signal,
wherein the data transmission authorization part estimates whether the transceiver for the radio communications is within a service area of the first one of the communications systems by comparing the distance estimated in the distance estimation part and the service area of the first one of the communications systems, and determines whether to authorize the data transmission in the second one of the communications systems based on a result of the estimation and the calculated cyclic autocorrelation value of the first one of the communications systems.

4. The controller as claimed in claim 1, further comprising:
a data transmission power determination part which controls transmission power of the data transmission in the second one of the communications systems based on the calculated cyclic autocorrelation value of the first one of the communications systems.

5. The controller as claimed in claim 4, further comprising:
a LOS/NLOS (Line of Sight)/(Non Line of Sight) estimation part which estimates whether a transmitter of the first one of the communications systems is in a LOS environment or in an NLOS environment; and
a distance estimation part which estimates a distance from the transmitter of the first one of the communications systems to the transceiver for the radio communications using a result of the estimation of the LOS/NLOS estimation part and the measured level of the received signal,
wherein the data transmission authorization part estimates whether the transceiver for the radio communications is within a service area of the first one of the communications systems by comparing the distance estimated in the distance estimation part and the service area of the first one of the communications systems, and determines whether to authorize the data transmission in the second one of the communications systems based on a result of the estimation and the calculated cyclic autocorrelation value of the first one of the communications systems.

6. The controller as claimed in claim 5, wherein the data transmission power determination part controls the transmission power of the data transmission in the second one of the communications systems based on the distance estimated in the distance estimation part and the calculated cyclic autocorrelation value of the first one of the communications systems.

7. The controller as claimed in claim 1, wherein the data transmission authorization part determines whether to authorize the data transmission in the second one of the communications systems based on a result of a chi-square test using the calculated cyclic autocorrelation value of the first one of the communications systems.

8. The controller as claimed in claim 1, wherein the cyclic autocorrelation value is obtained by determining a correlation between an original signal and a signal in which the original signal is frequency-shifted.

9. A radio communications transmission and reception method in a transceiver for radio communications in which a same frequency is shared between a plurality of communications systems, the radio communications transmission and reception method comprising:
measuring a level of a received signal;
calculating a cyclic autocorrelation value of a first one of the communications systems from the received signal only when the measured level of the received signal is lower than a threshold;
determining whether to authorize data transmission in a second one of the communications systems based on at least one of the measured level of the received signal and the calculated cyclic autocorrelation value of the first one of the communications systems; and
performing the data transmission in the second one of the communication systems based on a determination that the data transmission should be authorized.

* * * * *